(12) United States Patent
Abdallah et al.

(10) Patent No.: US 7,467,286 B2
(45) Date of Patent: *Dec. 16, 2008

(54) EXECUTING PARTIAL-WIDTH PACKED DATA INSTRUCTIONS

(75) Inventors: Mohammad Abdallah, Folsom, CA (US); James Coke, Shingle Springs, CA (US); Vladimir Pentkovski, Folsom, CA (US); Patrice Roussel, Portland, OR (US); Shreekant S. Thakkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 11/126,049

(22) Filed: May 9, 2005

(65) Prior Publication Data
US 2005/0216706 A1 Sep. 29, 2005

Related U.S. Application Data

(63) Continuation of application No. 09/852,217, filed on May 8, 2001, now Pat. No. 6,970,994, which is a continuation of application No. 09/053,127, filed on Mar. 31, 1998, now Pat. No. 6,230,253.

(51) Int. Cl.
*H04Q 3/00* (2006.01)
(52) U.S. Cl. ............... 712/2; 712/5; 712/20; 712/22; 712/23; 712/27
(58) Field of Classification Search ............. 712/221, 712/225, 218, 208, 2, 222; 708/608, 625, 708/490, 518, 622
See application file for complete search history.

(56) References Cited

U.S. PATENT DOCUMENTS 3,675,001 A 7/1972 Singh ..................... 235/175

(Continued)

FOREIGN PATENT DOCUMENTS

DE 3636106 A1 4/1987

(Continued)

OTHER PUBLICATIONS

Peleg et al. MMX Technology Extension to the Intel Architecture, 1996, IEEE Micro, pp. 42-50.*

(Continued)

*Primary Examiner*—Henry W. H. Tsai
*Assistant Examiner*—Cheng-Yuan Tseng
(74) *Attorney, Agent, or Firm*—Blakely, Sokoloff, Taylor & Zafman LLP

(57) ABSTRACT

A method and apparatus are provided for executing packed data instructions. According to one aspect of the invention, a processor includes registers, a register renaming unit coupled to the registers, a decoder coupled to the register renaming unit, and a partial-width execution unit coupled to the decoder. The register renaming unit provides an architectural register file to store packed data operands that include data elements. The decoder is to decode a first and second set of instructions that each specify one or more registers in the architectural register file. Each of the instructions in the first set specify operations to be performed on all of the data elements. In contrast, each of the instructions in the second set specify operations to be performed on only a subset of the data elements. The partial-width execution unit is to execute operations specified by either the first or second set of instructions.

29 Claims, 13 Drawing Sheets

U.S. PATENT DOCUMENTS

| | | | |
|---|---|---|---|
| 3,723,715 A | 3/1973 | Chen et al. | 235/175 |
| 3,900,724 A | 8/1975 | McIver | |
| 3,941,990 A | 3/1976 | Rabasse et al. | 235/176 |
| 4,542,476 A | 9/1985 | Nagafuji et al. | |
| 4,677,582 A | 6/1987 | Nagafuji | 364/749 |
| 4,760,545 A | 7/1988 | Inagami et al. | 364/200 |
| 4,771,379 A | 9/1988 | Ando et al. | 364/200 |
| 4,811,269 A | 3/1989 | Hirose et al. | 364/754 |
| 4,890,218 A | 12/1989 | Bram | 364/200 |
| 4,945,479 A | 7/1990 | Rusterholz et al. | |
| 4,972,362 A | 11/1990 | Elkind et al. | |
| 4,985,848 A | 1/1991 | Pfeiffer et al. | 364/518 |
| 5,001,662 A | 3/1991 | Baum | 364/749 |
| 5,047,975 A | 9/1991 | Patti et al. | |
| 5,081,698 A | 1/1992 | Kohn | |
| 5,126,964 A | 6/1992 | Zurawski | 364/757 |
| 5,161,247 A | 11/1992 | Murakami et al. | |
| 5,189,636 A | 2/1993 | Patti et al. | |
| 5,210,711 A | 5/1993 | Rossmere et al. | 364/786 |
| 5,241,493 A | 8/1993 | Chu et al. | |
| 5,303,355 A | 4/1994 | Gergen et al. | |
| 5,311,508 A | 5/1994 | Buda et al. | 370/60 |
| 5,327,369 A | 7/1994 | Ashkenazi | |
| 5,375,212 A | 12/1994 | Saini | |
| 5,390,135 A | 2/1995 | Lee et al. | |
| 5,426,598 A | 6/1995 | Hagihara | 364/759 |
| 5,515,520 A | 5/1996 | Hatta et al. | |
| 5,579,253 A * | 11/1996 | Lee et al. | 708/625 |
| 5,590,365 A | 12/1996 | Ide et al. | |
| 5,606,677 A | 2/1997 | Balmer et al. | |
| 5,642,306 A | 6/1997 | Mennemeir | 364/757 |
| 5,673,427 A | 9/1997 | Brown et al. | 395/595 |
| 5,701,508 A | 12/1997 | Glew et al. | |
| 5,721,892 A | 2/1998 | Peleg et al. | 395/562 |
| 5,742,840 A | 4/1998 | Hansen et al. | |
| 5,765,037 A | 6/1998 | Morrison et al. | |
| 5,778,419 A | 7/1998 | Hansen et al. | |
| 5,793,661 A * | 8/1998 | Dulong et al. | 708/603 |
| 5,794,060 A | 8/1998 | Hansen et al. | |
| 5,794,061 A | 8/1998 | Hansen et al. | |
| 5,802,336 A | 9/1998 | Peleg et al. | 395/376 |
| 5,806,049 A | 9/1998 | Petruzzi | 705/36 |
| 5,809,321 A | 9/1998 | Hansen et al. | |
| 5,819,101 A | 10/1998 | Peleg et al. | |
| 5,822,603 A | 10/1998 | Hansen et al. | |
| 5,835,392 A | 11/1998 | Dulong et al. | |
| 5,852,726 A | 12/1998 | Lin et al. | 395/376 |
| 5,870,619 A | 2/1999 | Wilkinson et al. | |
| 5,880,983 A | 3/1999 | Elliot et al. | |
| 5,883,824 A | 3/1999 | Lee et al. | |
| 5,884,071 A | 3/1999 | Kosaraju | |
| 5,936,872 A | 8/1999 | Fischer et al. | 364/754.03 |
| 5,953,241 A | 9/1999 | Hansen et al. | |
| 5,983,257 A | 11/1999 | Dulong et al. | |
| 6,006,318 A | 12/1999 | Hansen et al. | |
| 6,018,351 A | 1/2000 | Mennemeir | 345/437 |
| 6,035,387 A | 3/2000 | Hsu et al. | |
| 6,041,403 A | 3/2000 | Parker et al. | 712/210 |
| 6,122,725 A | 9/2000 | Roussel et al. | |
| 6,154,831 A | 11/2000 | Thayer et al. | |
| 6,178,482 B1 | 1/2001 | Sollars | |
| 6,192,467 B1 | 2/2001 | Abdallah et al. | |
| 6,230,253 B1 | 5/2001 | Roussel et al. | |
| 6,230,257 B1 | 5/2001 | Roussel et al. | |
| 6,233,671 B1 | 5/2001 | Abdallah et al. | |
| 6,260,137 B1 | 7/2001 | Fleck et al. | |
| 6,295,599 B1 | 9/2001 | Hansen et al. | |
| 6,378,060 B1 | 4/2002 | Hansen et al. | |
| 6,385,634 B1 | 5/2002 | Peleg et al. | |
| 6,470,370 B2 | 10/2002 | Fischer et al. | |
| 6,502,117 B2 | 12/2002 | Golliver et al. | |
| 6,584,482 B1 | 6/2003 | Hansen et al. | |
| 6,643,765 B1 | 11/2003 | Hansen et al. | |
| 6,687,810 B2 | 2/2004 | Roussel et al. | |
| 6,725,356 B2 | 4/2004 | Hansen et al. | |
| 6,970,994 B2 | 11/2005 | Abdallah et al. | |
| 7,159,100 B2 * | 1/2007 | van Hook et al. | 712/222 |
| 7,197,625 B1 * | 3/2007 | van Hook et al. | 712/2 |
| 7,313,788 B2 * | 12/2007 | Ben-David et al. | 717/150 |

FOREIGN PATENT DOCUMENTS

| | | |
|---|---|---|
| DE | 19914617 A | 10/1999 |
| GB | 9907164.9 | 10/1999 |
| GB | 9907221.7 | 10/1999 |
| GB | 2339040 | 12/2000 |
| HK | 1027402 | 11/2001 |
| WO | WO 97/08608 | 3/1997 |
| WO | WO9708608 | 3/1997 |
| WO | WO 97/22921 | 6/1997 |
| WO | WO 97/22923 | 6/1997 |
| WO | WO 97/22924 | 6/1997 |
| WO | WO 97/23821 | 7/1997 |
| WO | WO 99/04718 | 2/1999 |
| WO | WO 99/50740 | 10/1999 |

OTHER PUBLICATIONS

Intel MMX Technology Overview, Mar. 1996, pp. 1-17.*
IA-32 Intel Architecture Software Developer's Manual, 2004, vol. 1, pp. 10-9, 10-10, 11-6 and 11-7.*
Abbott et al., "Broadband Algorithms with the MicroUnity Mediaprocessor", Proceedings of Compcon '96, 1996, pp. 349-354.
Hayes et al., "MicroUnity Software Development Environment", Proceedings of Compcon '96, 1996, pp. 341-348.
Samsung Electronics, "21164 Alpha Microprocessor Data Sheet", 1997.
Silicon Graphics, "Silicon Graphics Introduces Enhanced MIPS Architecture to Lead the Interactive Digital Revolution", Oct. 21, 1996, 2 pages.
Philips Electronics, "TriMedia TM1000 Preliminary Data Book", 1997.
"MIPS Digital Media Extension", pp. C1 to C40.
"MIPS Extension for Digital Media with 3D", MIPS Technologies, Inc. Mar. 12, 1997, pp. 1-26.
"The VIS™ Instruction Set", Sun Microsystems, Inc. 1997, pp. 1-2.
"Silicon Graphics Introduces Compact MIPS® RISC Microprocessor Code for High Performance at a Low Cost", Oct. 21, 1996, downloaded from Website webmaster@www.sgi.com, pp. 1-2.
Killian, Earl, "MIPS Extension for Digital Media", Silicon Graphics, pp. 1-10.
"MIPS V Instruction Set", pp. B1 to B-37.
"64-Bit and Multimedia Extensions In the PA-RISC 2.0 Architecture", Hewlett Pachard, downloaded from the Website rblee@cup.hp.com.huck@cup.hp.com, pp. 1-8.
"ULTRASPARC™ The Visual Instruction Set (VIS™): On Chip Support for New-Media Processing", Sun Microsystems, Inc. 1996, pp. 1-7.
ULTRASPARC™ and New Media Support Real-Time MPEG2 Decode with the Visual Instruction Set (VIS™), Sun Microsystems, 1996, pp. 1-8.
ULTRASPARC™ Ultra Port Architecture (UPA): The New-Media System Architecture, Sun Microsystems, Inc. 1996, pp. 1-4.
ULTRASPARC™ Turbocharges Network Operations on New Media Computing, Sun Microsystem, Inc., 1996, pp. 1-5.
The ULTRASPARC Processor—Technology White Paper, Sun Microsystems, Inc. 1995, 37 pages.
AMD-3D™ Technology Manual, Advanced Micro Devices, Feb. 1998.
Hansen, Craig, Architecture of a Broadband Mediaprocessor, MicroUnity Systems Engineering, Inc., 1996, pp. 334-354.
Levinthal, Adam, et al. Parallel Computers for Graphics Applications, Pixar, San Rafael, CA, 1987, pp. 193-198.
Levinthal, Adam; Porter, Thomas, "Chap-A SIMD Graphics Processor", Computer Graphics Project, Lucasfilm Ltd., 1984, pp. 77-82.

Wang, Mangaser, Shrinivan, A processor Architecture for 3D Graphics Calculations, Computer Motion,Inc., pp. 1-23.
Visual Instruction Set (VIS™), User's Guide, Sun Microsystems, Inc., version 1.1 Mar. 1997.
Santoro, Mark; Design and Clocking of VLSI Multipliers. Technical Report No. CSL-TR-89-397, Oct. 1989, pp. i-xii and 1-118.
Santoro, Mark, et al.; SPIM: A Pipelined 64×64 bit Interative Multiplier, IEEE Journal of Solid -State Circuits, vol. 24, No. 2, Apr. 1989. pp. 487-493.
Santoro, Mark, et al.; Session II: High-Speed Microprocessor. WAM 2.6: A Piplelined 64×64b Interative Array Multiplier. 1988 IEEE International Solid State Circuits Conference . pp. 36-37 and 290.
BIT Preliminary, Bipolar Integrated Technology, Inc. B3110/B3120;B2110/B2120 Floating Point Chip Set. pp. 1-40.
Eklind, Bob, et al. A SUB 10 nS Bipolar 64 Bit Integrated/Floating Point Processor Implemented On Two Circuits. IEEE 1987 BCTM, pp. 101-104.
Leibowitz, Bob; et al., System Design; ECL gains ground in battle against CMOS. Computer Design; Apr. 1, 1987. pp. 91-95.
IBM. TBD: Double Speed, Single Precision Vector Register Organization Using Double Port Chips. Feb. 1981. pp. 1-6.
Farmwald, P. Michael; High Bandwidth Evaluation of Elementary Functions, S-1 Project. IEEE 1981. pp. 139-142.
Farmwald, P. Michael; On the Design of High Performance Digital Arithmetic Units. UCRL-53190. Aug. 1981. pp. i-vii and 1-95.
Grimes et al.; 64-Bit Processor. The Intel i860 64-Bit Processor: A General-Purpose CPU with 3D Graphics Capabilities. Jul. 1989. pp. 85-94.
Ide, et al.; A 320-MFLOPS CMOS Floating-Point Processing Unit for Superscalar Processors. IEEE Journal of Solid State Circuits, vol. 28, No. 3, Mar. 1993. pp. 352-361.
Lino, et al.; ISSCC 92 Session 6/ Microprocessors/ TA 6.5: A 289MFLOPS Single-Chip Supercomputer. 1992 IEEE International Solid State Circuits Conference. pp. 112-113.
Kohn, et al.; Introducing the Intel i860 64 Bit Microprocessor, Intel Corp. Aug. 1989. pp. 15-30.
Lee, Ruby B.; Accelerating Multimedia with Enhanced Microprocessors. Hewlett-Packard. IEEE Micro, Apr. 1995, pp. 22-32.
Lee, Ruby B.; Realtime MPEG Video via Software Decompression on a PA-RISC Processor. 1995 IEEE, pp. 186-192.
Manferdelli, John L. et al.; Signal Processing Aspects of the S-1 Multiprocessor Project. UCRL-84658. Jul. 28, 1980. pp. 1-8.
Spaderna, D., et al.; An Integrated Floating Point Vector Processor for DSP and Scientific Computing. Sharp Microelectronics Technology Inc. IEEE 1989. pp. 8-13.
Undy, Steve, et al.; A Low-Cost Graphics and Multimedia Workstation Chip Set. Apr. 1994, IEEE micro, pp. 10-22.
"MIPS Digital Media Extension", pp. C1 to C40.
"MIPS V Instruction Set", MIPS V Specification, Rev. 1.0, pp. B1-37.
Abbott, Curtis , et al., "Broadband Algorithms with the MicroUnity Mediaprocessor", *Proceedings of Compcon '96*, (1996), 349-354.
Farmwald, Paul M., "High Bandwidth Evaluation of Elementary Functions, S-1 Project", *IEEE*, (1981), 139-142.
Farmwald, P. M., "On the Design of High Performance Digital Arithmetic Units", *UCRL-53190*, (Aug. 1981), i-viii & 1-95.

Grimes, Jack , et al., "64-Bit Processor. The Intel i860 64-Bit Processor: A General Purpose CPU with 3D Graphics Capabilities", (Jul. 1989), 85-94.
Hansen, Craig , "Architecture of a Broadband Mediaprocessor", *MicroUnity Systems Engineering, Inc.*, Proceedings of Compcon '96, (1996), pp. 334-340.
Hayes, Raymond , et al., "MicroUnity Software Development Environment", *Proceedings of Compcon '96*, (1996), 341-348.
Hewlett Packard, "64-Bit and Multimedia Extensions in the PA-RISC 2.0 Architecture", (Jul. 17, 1997), 1-18.
IBM, "TDB: Double Speed, Single Precision Vector Register Organization Using Double Port Chips", (Feb. 1981), 1-6.
Ide, Nobuhiro , et al., "A 320-MFLOPS CMOS Floating-Point Processing Unit for Superscalar Processors", *IEEE Journal of Solid State Circuits*, vol. 28, No. 3, (Mar. 1993), 352-361.
Iino, Hideyuki , et al. "ISSCC 92 Session 6 / Microprocessors / TA 6.5: A 289MFLOPS Single-Chip Supercomputer", *1992 IEEE International Solid State Circuits Conference*, (1992), 112-113.
Killian, Earl , "MIPS Extension for Digital Media", *Silicon Graphics, Inc.*, 1-10.
Kohn, Les , et al., "Introducing the Intel i860 64 Bit Microprocessor", *Intel Corporation*, (Aug. 1989), 15-30.
Lee, Ruby B., "Accelerating Multimedia with Enhanced Microprocessors", *Hewlett Packard. IEEE Micro*, (Apr. 1995), pp. 22-32.
Lee, Ruby B., "Realtime MPEG Video via Software Decompression on a PA-RISC Processor", *1995 IEEE*, (1995), 186-192.
Levinthal, Adam , et al., "Chap-A SIMD Graphics Processor", *Computer Graphics Project, Lucasfilm Ltd.*, (1984), pp. 77-82.
Levinthal, Adam , et al., "Parallel Computers for Graphics Applications", *Pixar*, San Rafael, CA, (1987), 193-198.
Manferdelli, John L., et al., "Signal Processing Aspects of the S-1 Multiprocessor Project", *UCRL-84658*, (Jul. 28, 1980), 1-8.
MIPS Technologies, Inc,, "MIPS Extension for Digital Media with 3D", (Mar. 12, 1997), 30 pages.
Philips Electronics, "TriMedia TM1000 Preliminary Data Book", (1997), 496 pages.
Silicon Graphics, Inc., "MIPS Digital Media Extension", pp. C1-C40.
Silicon Graphics, Inc., "Silicon Graphics Introduces Compact MIPS@ RISC Microprocessor Code for High Performance at a Low Cost", www.sgi.com, (Oct. 21, 1996), 1-2.
Spaderna, D. , et al., "An Integrated Floating Point Vector Processor for DSP and Scientific Computing", *Sharp Microelectrinics Technology, Inc. IEEE*, (1989), 8-13.
Sun Microsystems, Inc., "The ULTRASPARC Processor—Technology White Paper", (1995), 35 pages.
Sun Microsystems, Inc., "Visual Instruction Set (VIS) User's Guide", *Version 1.1*, (Mar. 1997), 130 pages.
Undy, Steve , et al., "A Low-Cost Graphics and Multimedia Workstation Chip Set", *IEEE Micro*, (1994), 10-22.
Wang, Yulan , et al., "A Processor Architecture for 3D Graphics Calculations", *Computer Motion, Inc.*, (Sep. 1992), pp. 1-23.

* cited by examiner

∗ = CORRESPONDING DATA ELEMENT IN X OR Y, NaN, 0, OR OTHER PREDETERMINED VALUE

EXECUTING PARTIAL-WIDTH PACKED DATA INSTRUCTIONS

The present application is a continuation of U.S. patent application Ser. No. 09/852,217, filed on May 8, 2001, now U.S. Pat. No. 6,970,994 which is a continuation application of U.S. application Ser. No. 09/053,127, entitled Executing Partial-Width Packed Data Instructions, and filed on Mar. 31, 1998, now U.S. Pat. No. 6,230,253. U.S. patent application Ser. No. 09/852,217 is hereby incorporated herein by reference.

FIELD OF THE INVENTION

The invention relates generally to the field of computer systems. More particularly, the invention relates to a method and apparatus for efficiently executing partial-width packed data instructions, such as scalar packed data instructions, by a processor that makes use of SIMD technology, for example.

BACKGROUND OF THE INVENTION

Multimedia applications such as 2D/3D graphics, image processing, video compression/decompression, voice recognition algorithms and audio manipulation, often require the same operation to be performed on a large number of data items (referred to as "data parallelism"). Each type of multimedia application typically implements one or more algorithms requiring a number of floating point or integer operations, such as ADD or MULTIPLY (hereafter MUL). By providing macro instructions whose execution causes a processor to perform the same operation on multiple data items in parallel, Single Instruction Multiple Data (SIMD) technology, such as that employed by the PENTIUM® processor architecture and the MMX™. instruction set, has enabled a significant improvement in multimedia application performance (PENTIUM® and MMX™ are registered trademarks or trademarks of INTEL® Corporation of Santa Clara, Calif.).

SIMD technology is especially suited to systems that provide packed data formats. A packed data format is one in which the bits in a register are logically divided into a number of fixed-sized data elements, each of which represents a separate value. For example, a 64-bit register may be broken into four 16-bit elements, each of which represents a separate 16-bit value. Packed data instructions may then separately manipulate each element in these packed data types in parallel.

Referring to FIG. 1, an exemplary packed data instruction is illustrated. In this example, a packed ADD instruction (e.g., a SIMD ADD) adds corresponding data elements of a first packed data operand, X, and a second packed data operand, Y, to produce a packed data result, Z, i.e., $X_0+Y_0=Z_0$, $X_1+Y_1=Z_1$, $X_2+Y_2=Z_2$, and $X_3+Y_3=Z_3$. Packing many data elements within one register or memory location and employing parallel hardware execution allows SIMD architectures to perform multiple operations at a time, resulting in significant performance improvement. For instance, in this example, four individual results may be obtained in the time previously required to obtain a single result.

While the advantages achieved by SIMD architectures are evident, there remain situations in which it is desirable to return individual results for only a subset of the packed data elements.

SUMMARY OF THE INVENTION

A method and apparatus are described for executing partial-width packed data instructions. According to one aspect of the invention, a processor includes a plurality of registers, a register renaming unit coupled to the plurality of registers, a decoder coupled to the register renaming unit, and a partial-width execution unit coupled to the decoder. The register renaming unit provides an architectural register file to store packed data operands each of which include a plurality of data elements. The decoder is configured to decode a first and second set of instructions that each specify one or more registers in the architectural register file. Each of the instructions in the first set of instructions specifies operations to be performed on all of the data elements stored in the one or more specified registers. In contrast, each of the instructions in the second set of instructions specify operations to be performed on only a subset of the data elements stored in the one or more specified registers. The partial-width execution unit is configured to execute operations specified by either of the first or the second set of instructions.

Other features and advantages of the invention will be apparent from the accompanying drawings and from the detailed description.

BRIEF DESCRIPTION OF THE DRAWINGS

The invention is described by way of example and not by way of limitation with reference to the figures of the accompanying drawings in which like reference numerals refer to similar elements and in which.

DETAILED DESCRIPTION

Figure 1:
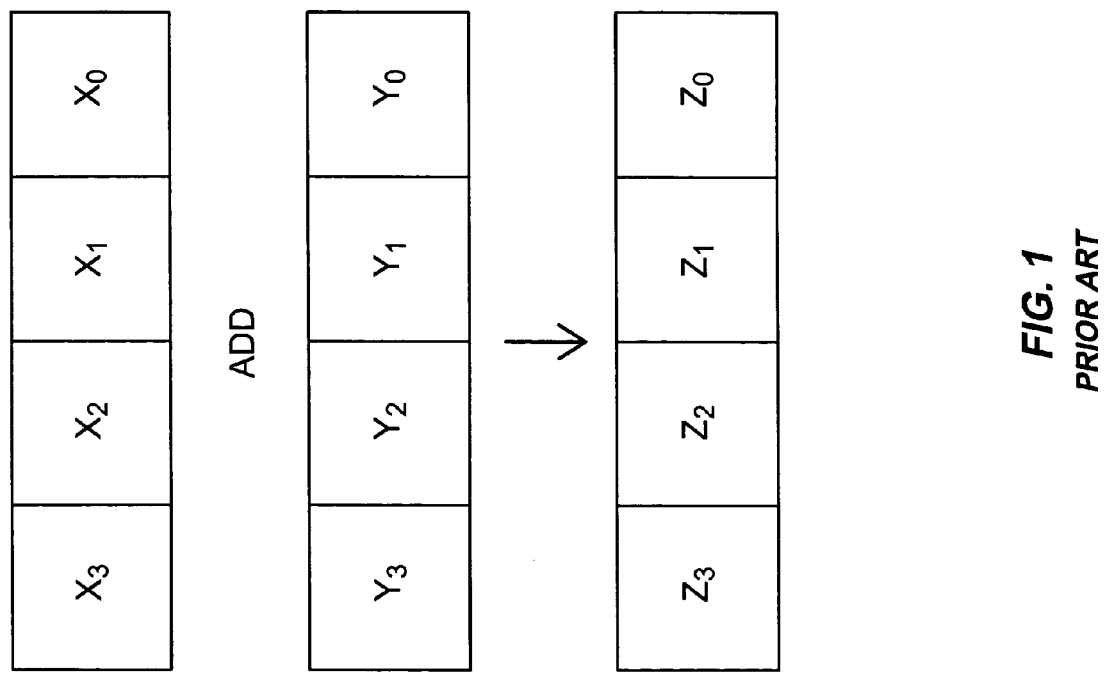
FIG. 1 illustrates a packed ADD instruction adding together corresponding data elements from a first packed data operand and a second packed data operand.

A method and apparatus are described for performing partial-width packed data instructions. Herein the term "full-width packed data instruction" is meant to refer to a packed data instruction (e.g., a SIMD instruction) that operates upon all of the data elements of one or more packed data operands. In contrast, the term "partial-width packed data instruction" is meant to broadly refer to a packed data instruction that is designed to operate upon only a subset of the data elements of one or more packed data operands and return a packed data result (to a packed data register file, for example). For instance, a scalar SIMD instruction may require only a result of an operation between the least significant pair of packed data operands. In this example, the remaining data elements of the packed data result are disregarded as they are of no consequence to the scalar SIMD instruction (e.g., the remaining data elements are don't cares). According to the various embodiments of the invention, execution units may be configured in such a way to efficiently accommodate both full-width packed data instructions (e.g., SIMD instructions) and a set of partial-width packed data instructions (e.g., scalar SIMD instructions).

In the following detailed description, for purposes of explanation, numerous specific details are set forth in order to provide a thorough understanding of the invention. It will be apparent, however, to one of ordinary skill in the art that these specific details need not be used to practice the invention. In other instances, well-known devices, structures, interfaces, and processes have not been shown or are shown in block diagram form.

Justification of Partial-Width Packed Data Instructions

Considering the amount of software that has been written for scalar architectures (e.g., single instruction single data (SISD) architectures) employing scalar operations on single precision floating point data, double precision floating point data, and integer data, it is desirable to provide developers with the option of porting their software to architectures that support packed data instructions, such as SIMD architectures, without having to rewrite their software and/or learn new instructions. By providing partial-width packed data instructions, a simple translation can transform old scalar code into scalar packed data code. For example, it would be very easy for a compiler to produce scalar SIMD instructions from scalar code. Then, as developers recognize portions of their software that can be optimized using SIMD instructions, they may gradually take advantage of the packed data instructions. Of course, computer systems employing SIMD technology are likely to also remain backwards compatible by supporting SISD instructions as well. However, the many recent architectural improvements and other factors discussed herein make it advantageous for developers to transition to and exploit SIMD technology, even if only scalar SIMD instructions are employed at first.

Another justification for providing partial-width packed data instructions is the many benefits which may be achieved by operating on only a subset of a full-width operand, including reduced power consumption, increased speed, a clean exception model, and increased storage. As illustrated below, based on an indication provided with the partial-width packed data instruction, power savings may be achieved by selectively shutting down those of the hardware units that are unnecessary for performing the current operation.

Another situation in which it is undesirable to force a packed data instruction to return individual results for each pair of data elements includes arithmetic operations in an environment providing partial-width hardware. Due to cost and/or die limitations, it is common not to provide full support for certain arithmetic operations, such as divide. By its nature, the divide operation is very long, even when full-width hardware (e.g., a one-to-one correspondence between execution units and data elements) is implemented. Therefore, in an environment that supports only full-width packed data operations while providing partial-width hardware, the latency becomes even longer. As will be illustrated further below, a partial-width packed data operation, such as a partial-width packed data divide operation, may selectively allow certain portions of its operands to bypass the divide hardware. In this manner, no performance penalty is incurred by operating upon only a subset of the data elements in the packed data operands.

Additionally, exceptions raised in connection with extraneous data elements may cause confusion to the developer and/or incompatibility between SISD and SIMD machines. Therefore, it is advantageous to report exceptions for only those data elements upon which the instruction is meant to operate. Partial-width packed data instruction support allows a predictable exception model to be achieved by limiting the triggering of exceptional conditions to those raised in connection with the data elements being operated upon, or in which exceptions produced by extraneous data elements would be likely to cause confusion or incompatibility between SISD and SIMD machines.

Finally, in embodiments where portions of destination packed data operand is not corrupted as a result of performing a partial-width packed data operation, partial-width packed data instructions effectively provide extra register space for storing data. For instance, if the lower portion of the packed data operand is being operated upon, data may be stored in the upper portion and vice versa.

An Exemplary Computer System

Figure 2A:
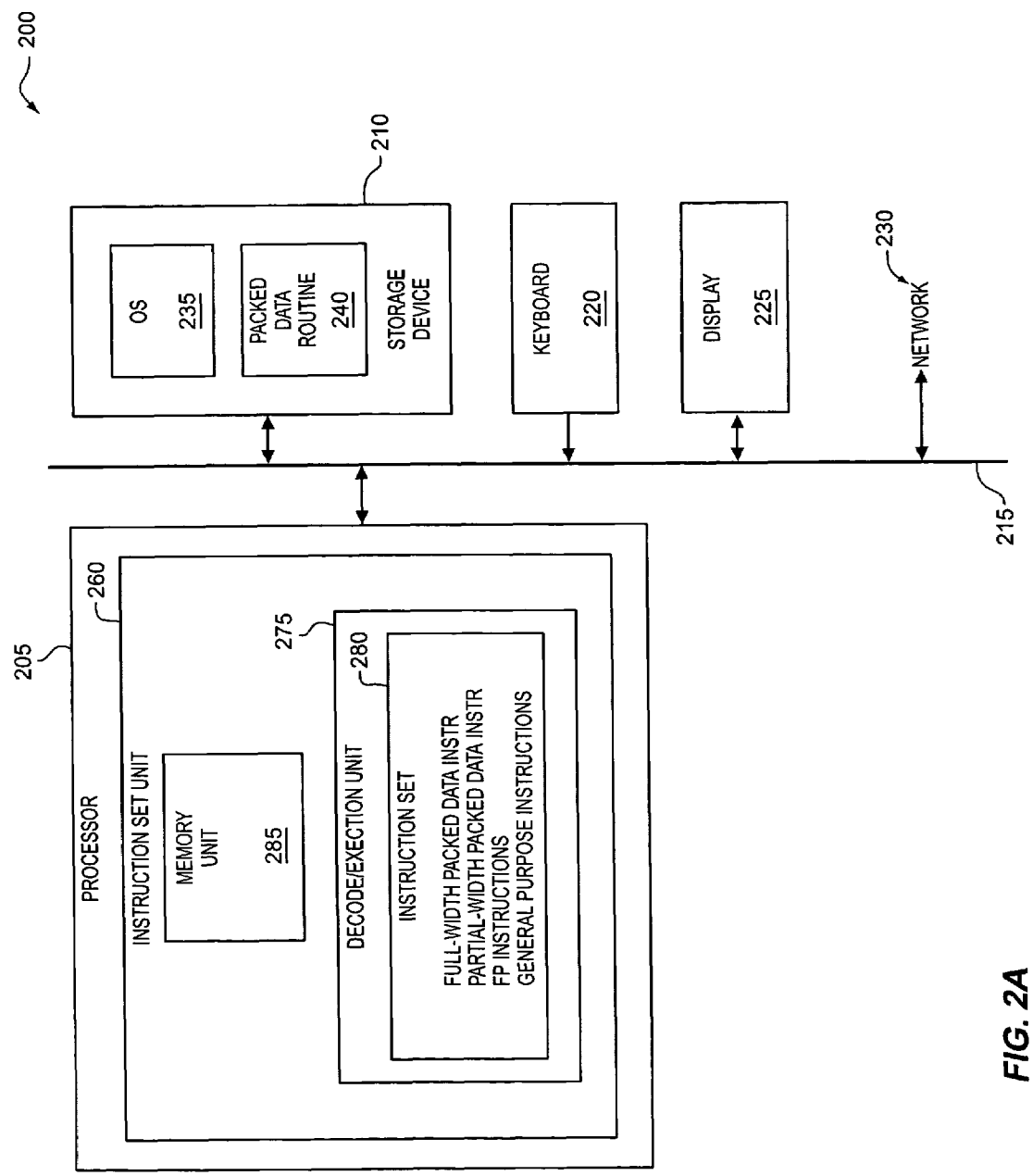
FIG. 2A is a simplified block diagram illustrating an exemplary computer system according to one embodiment of the invention.

FIG. 2A is a simplified block diagram illustrating an exemplary computer system according to one embodiment of the invention. In the embodiment depicted, computer system 200 includes a processor 205, a storage device 210, and a bus 215. The processor 205 is coupled to the storage device 210 by the bus 215. In addition, a number of user input/output devices, such as a keyboard 220 and a display 225 are also coupled to bus 215. The computer system 200 may also be coupled to a network 230 via bus 215. The processor 205 represents a central processing unit of any type of architecture, such as a CISC, RISC, VLIW, or hybrid architecture. In addition, the processor 205 may be implemented on one or more chips. The storage device 210 represents one or more mechanisms for storing data. For example, the storage device 210 may include read only memory (ROM), random access memory (RAM), magnetic disk storage mediums, optical storage mediums, flash memory devices, and/or other machine-readable mediums. The bus 215 represents one or more buses (e.g., AGP, PCI, ISA, X-Bus, EISA, VESA, etc.) and bridges (also termed as bus controllers). While this embodiment is described in relation to a single processor computer system, it is appreciated that the invention may be implemented in a multi-processor computer system. In addition while the present embodiment is described in relation to a 32-bit and a 64-bit computer system, the invention is not limited to such computer systems.

FIG. 2A additionally illustrates that the processor 205 includes an instruction set unit 260. Of course, processor 205 contains additional circuitry; however, such additional circuitry is not necessary to understanding the invention. At any rate, the instruction set unit 260 includes the hardware and/or firmware to decode and execute one or more instruction sets. In the embodiment depicted, the instruction set unit 260 includes a decode/execution unit 275. The decode unit decodes instructions received by processor 205 into one or more micro instructions. The execution unit performs appropriate operations in response to the micro instructions received from the decode unit. The decode unit may be implemented using a number of different mechanisms (e.g., a lookup table, a hardware implementation, a PLA, etc.).

In the present example, the decode/execution unit 275 is shown containing an instruction set 280 that includes both full-width packed data instructions and partial-width packed data instructions. These packed data instructions, when executed, may cause the processor 205 to perform full-/partial-width packed floating point operations and/or full-/partial-width packed integer operations. In addition to the packed data instructions, the instruction set 280 may include other instructions found in existing micro processors. By way of example, in one embodiment the processor 205 supports an instruction set which is compatible with Intel 32-bit architecture (IA-32) and/or Intel 64-bit architecture (IA-64).

A memory unit 285 is also included in the instruction set unit 260. The memory unit 285 may include one or more sets of architectural registers (also referred to as logical registers) utilized by the processor 205 for storing information including floating point data and packed floating point data. Additionally, other logical registers may be included for storing integer data, packed integer data, and various control data, such as a top of stack indication and the like. The terms architectural register and logical register are used herein to refer to the concept of the manner in which instructions specify a storage area that contains a single operand. Thus, a logical register may be implemented in hardware using any number of well known techniques, including a dedicated physical register, one or more dynamically allocated physical registers using a register renaming mechanism (described in further detail below), etc. In any event, a logical register represents the smallest unit of storage addressable by a packed data instruction.

In the embodiment depicted, the storage device 210 has stored therein an operating system 235 and a packed data routine 240 for execution by the computer system 200. The packed data routine 240 is a sequence of instructions that may include one or more packed data instructions, such as scalar SIMD instructions or SIMD instructions. As discussed further below, there are situations, including speed, power consumption and exception handling, where it is desirable to perform an operation on (or return individual results for) only a subset of data elements in a packed data operand or a pair of packed data operands. Therefore, it is advantageous for processor 205 to be able to differentiate between full-width packed data instructions and partial-width packed data instructions and to execute them accordingly.

Figure 2C:
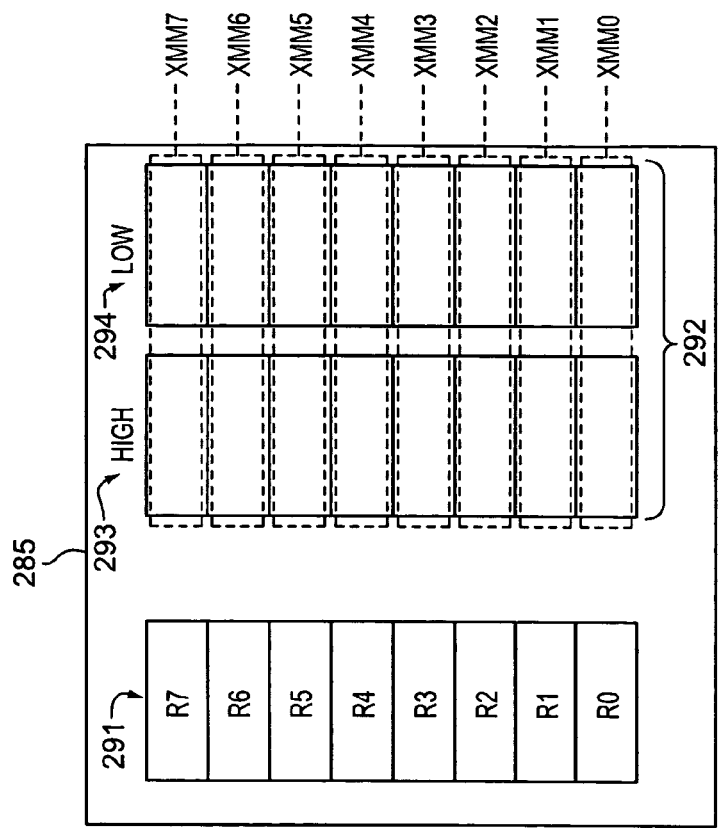
FIG. 2C is a simplified block diagram illustrating exemplary sets of logical registers according to another embodiment of the invention.
Figure 2B:
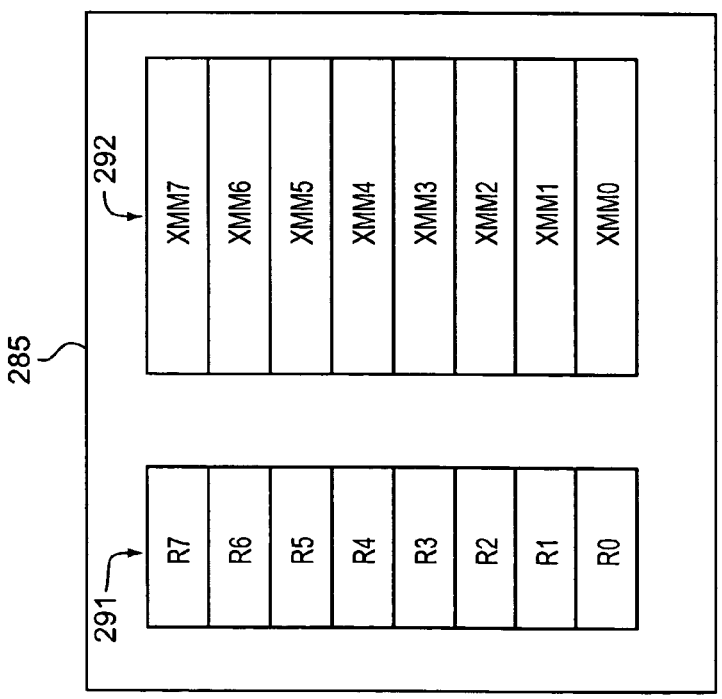
FIG. 2B is a simplified block diagram illustrating exemplary sets of logical registers according to one embodiment of the invention.

FIG. 2B is a simplified block diagram illustrating exemplary sets of logical registers according to one embodiment of the invention. In this example, the memory unit 285 includes a plurality of scalar floating point registers 291 (a scalar register file) and a plurality of packed floating point registers 292 (a packed data register file). The scalar floating point registers 291 (e.g., registers $R_0$-$R_7$) may be implemented as a stack referenced register file when floating point instructions are executed so as to be compatible with existing software written for the Intel Architecture. In alternative embodiments, however, the registers 291 may be treated as a flat register file. In the embodiment depicted, each of the packed floating point registers (e.g., $XMM_0$-$XMM_7$) are implemented as a single 128-bit logical register. It is appreciated, however, wider or narrower registers may be employed to conform to an implementation that uses more or less data elements or larger or smaller data elements. Additionally, more or less packed floating point registers 292 may be provided. Similar to the scalar floating point registers 291, the packed floating point registers 292 may be implemented as either a stack referenced register file or a flat register file when packed floating point instructions are executed.

FIG. 2C is a simplified block diagram illustrating exemplary sets of logical registers according to another embodiment of the invention. In this example, the memory unit 285, again, includes a plurality of scalar floating point registers 291 (a scalar register file) and a plurality of packed floating point registers 292 (a packed data register file). However, in the embodiment depicted, each of the packed floating point registers (e.g., XMM0-XMM7) are implemented as a corresponding pairs of high 293 and low registers 294. As will be discussed further below, it is advantageous for purposes of instruction decoding to organize the logical register address space for the packed floating point registers 292 such that the high and low register pairs differ by a single bit. For example, the high and low portions of XMM0-XMM7 may be differentiated by the MSB. Preferably, each of the packed floating point registers 291 are wide enough to accommodate four 32-bit single precision floating point data elements. As above, however, wider or narrower registers may be employed to conform to an implementation that uses more or less data elements or larger or smaller data elements. Additionally, while the logical packed floating point registers 292 in this example each comprise corresponding pairs of 64-bit registers; in alternative embodiments each packed floating point register may comprise any number of registers.

Instruction Execution Overview

Having described an exemplary computer system in which one embodiment of the invention may be implemented, instruction execution will now be described.

Figure 3:
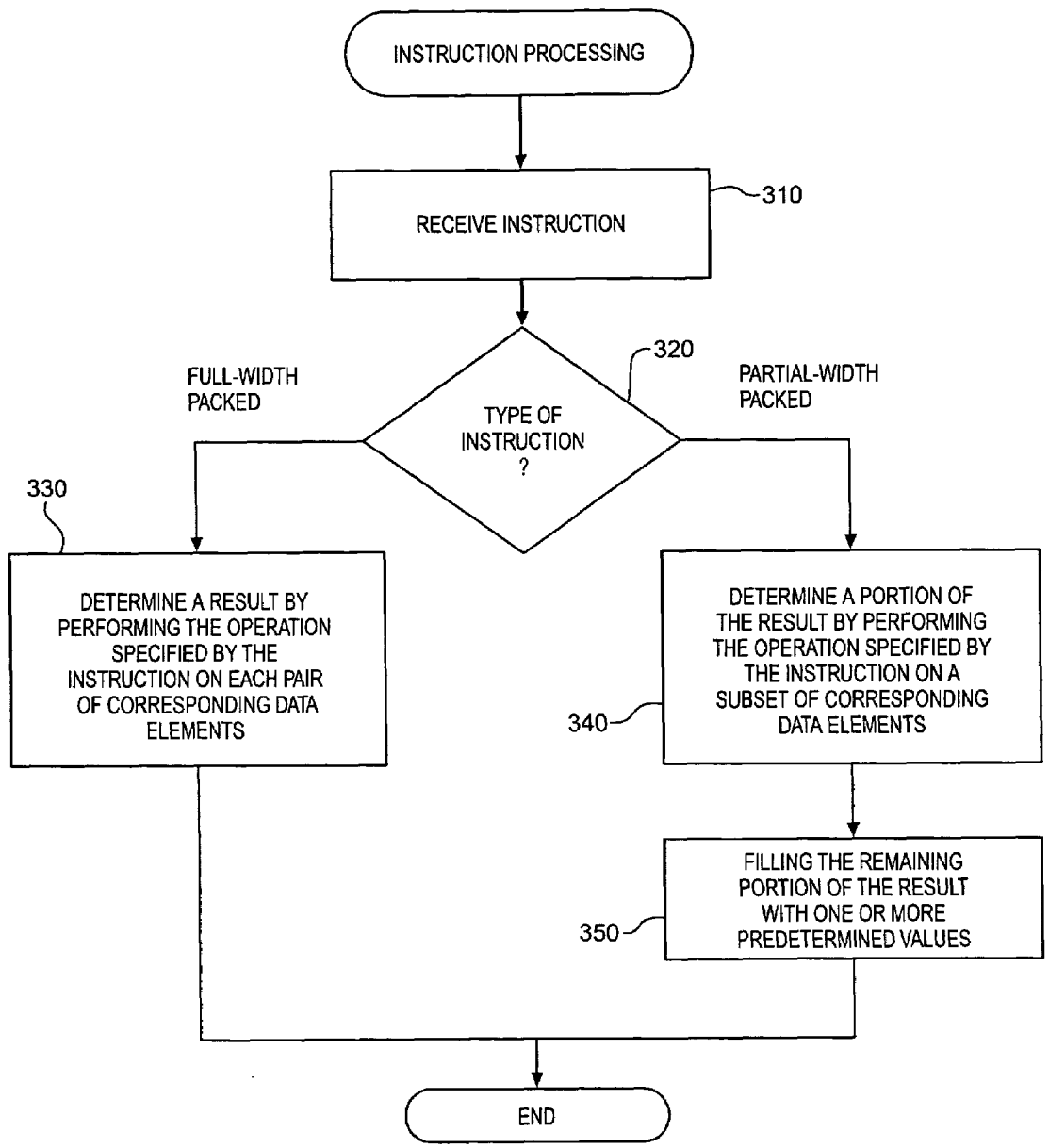
FIG. 3 is a flow diagram illustrating instruction execution according to one embodiment of the invention.

FIG. 3 is a flow diagram illustrating instruction execution according to one embodiment of the invention. At step 310, an instruction is received by the processor 205. At step 320, based on the type of instruction, partial-width packed data instruction (e.g., scalar SIMD instruction) or full-width packed data instruction (e.g., SIMD instruction), processing continues with step 330 or step 340. Typically, in the decode unit the type of instruction is determined based on information contained within the instruction. For example, information may be included in a prefix or suffix that is appended to an opcode or provided via an immediate value to indicate whether the corresponding operation is to be performed on all or a subset of the data elements of the packed data operand(s). In this manner, the same opcodes may be used for both full-width packed data operations and partial-width packed data operations. Alternatively, one set of opcodes may be used for partial-width packed data operations and a different set of opcodes may be used for full-width packed data operations.

In any event, if the instruction is a conventional full-width packed data instruction, then at step 330, a packed data result is determined by performing the operation specified by the instruction on each of the data elements in the operand(s). However, if the instruction is a partial-width packed data instruction, then at step 340, a first portion of the result is determined by performing the operation specified by the instruction on a subset of the data elements and the remainder of the result is set to one or more predetermined values. In one embodiment, the predetermined value is the value of the corresponding data element in one of the operands. That is, data elements may be "passed through" from data elements of one of the operands to corresponding data, elements in the packed data result. In another embodiment, the data elements in the remaining portion of the result are all cleared (zeroed). Exemplary logic for performing the passing through of data elements from one of the operands to the result and exemplary logic for clearing data elements in the result are described below.

Figure 4:
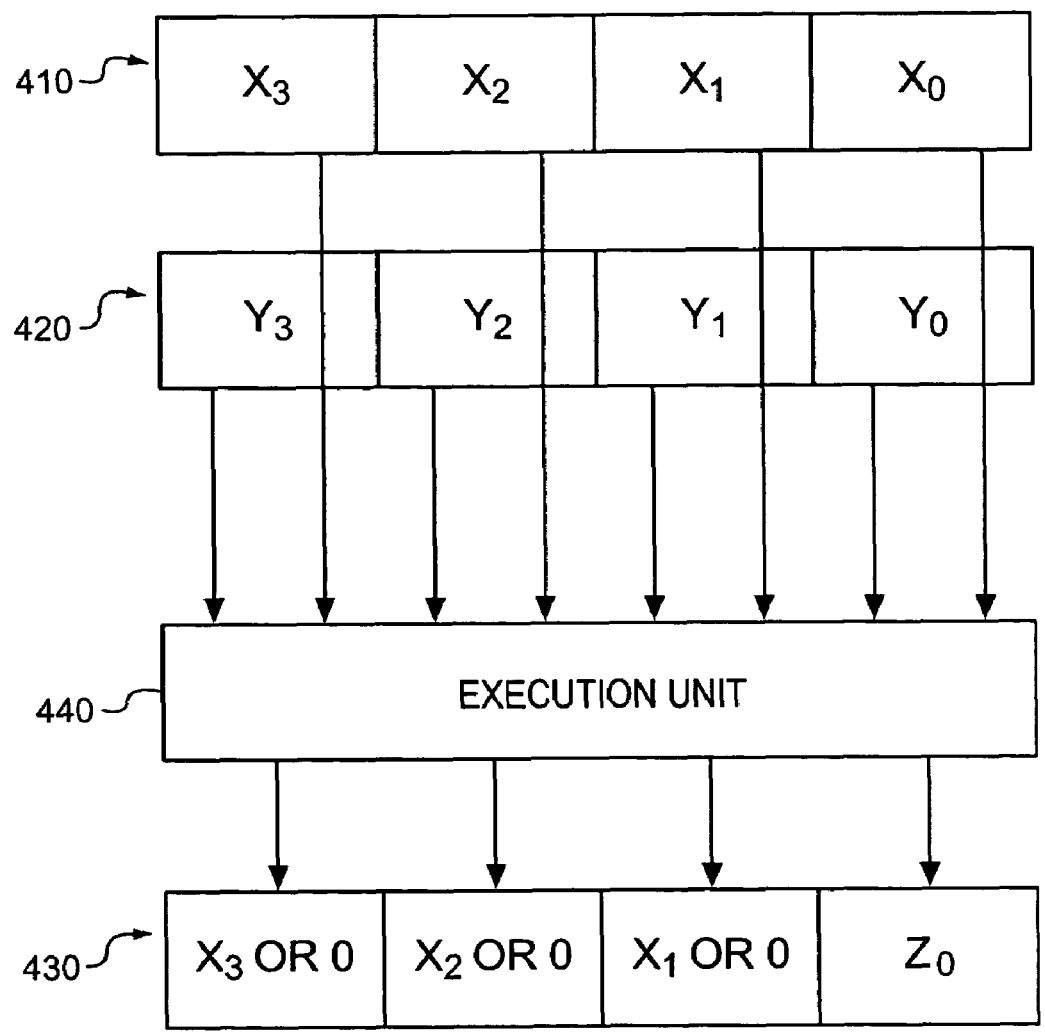
FIG. 4 conceptually illustrates the result of executing a partial-width packed data instruction according to various embodiments of the invention.

FIG. 4 conceptually illustrates the result of executing a partial-width packed data instruction according to various embodiments of the invention. In this example, an operation is performed on data elements of two logical source registers 410 and 420 by an execution unit 440. The execution unit 440 includes circuitry and logic for performing the operation specified by the instruction. In addition, the execution unit 440 may include selection circuitry that allows the execution unit 440 to operate in a partial-width packed data mode or a full-width packed data mode. For instance, the execution unit 440 may include pass through circuitry to pass data elements from one of the logical source registers 410, 420 to the logical destination register 430, or clearing circuitry to clear one or more data elements of the logical destination register 430, etc. Various other techniques may also be employed to affect the result of the operation, including forcing one of the inputs to the operation to a predetermined value, such as a value that would cause the operation to perform its identity function or a value that may pass through arithmetic operations without signaling an exception (e.g., a quiet not-a-number (QNaN)).

In the example illustrated, only the result ($Z_0$) of the operation on the first pair of data elements ($X_0$ and $Y_0$) is stored in the logical destination register 430. Assuming the execution unit 440 includes pass through logic, the remaining data elements of the logical destination register 430 are set to values from corresponding data elements of logical source register 410 (i.e., $X_3$, $X_2$, and $X_1$). While the logical destination register 430 is shown as a separate logical register, it is important to note that it may concurrently serve as one of the logical source registers 410, 420. Therefore, it should be appreciated that setting data elements of the logical destination register 430 to values from one of the logical source registers 410, 420 in this context may include doing nothing at all. For example, in the case that logical source register 410 is both a logical source and destination register, various embodiments may take advantage of this and simply not touch one or more of the data elements which are to be passed through.

Alternatively, the execution unit 440 may include clearing logic. Thus, rather than passing through values from one of the logical source registers to the logical destination register 430, those of the data elements in the result that are unnecessary are cleared. Again, in this example, only the result ($Z_0$) of the operation on the first pair of data elements ($X_0$ and $Y_0$) is stored in the logical destination register 430. The remaining data elements of the logical destination register 430 are "cleared" (e.g., set to zero, or any other predetermined value for that matter).

Full-Width Hardware

Figure 5A:
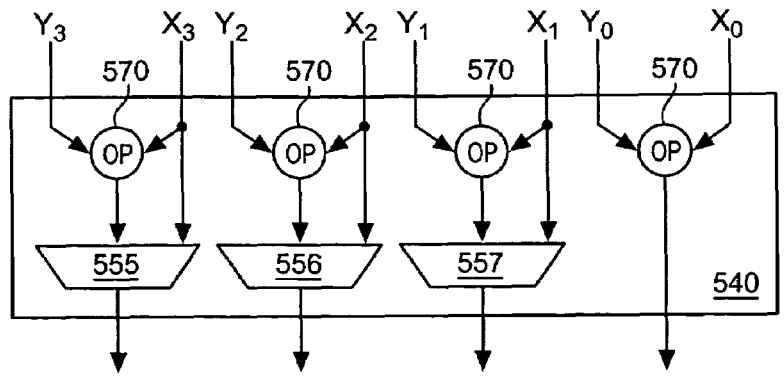
FIG. 5A conceptually illustrates circuitry for executing full-width packed data instructions and partial-width packed data instructions according to one embodiment of the invention.
Figure 5B:
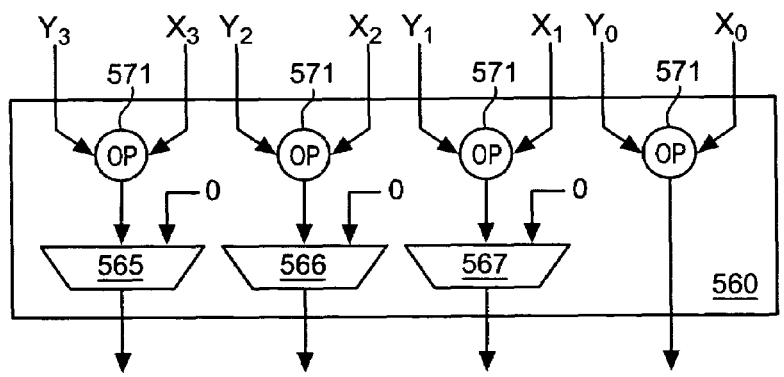
FIG. 5B conceptually illustrates circuitry for executing full-width packed data and partial-width packed data instructions according to another embodiment of the invention.
Figure 5C:
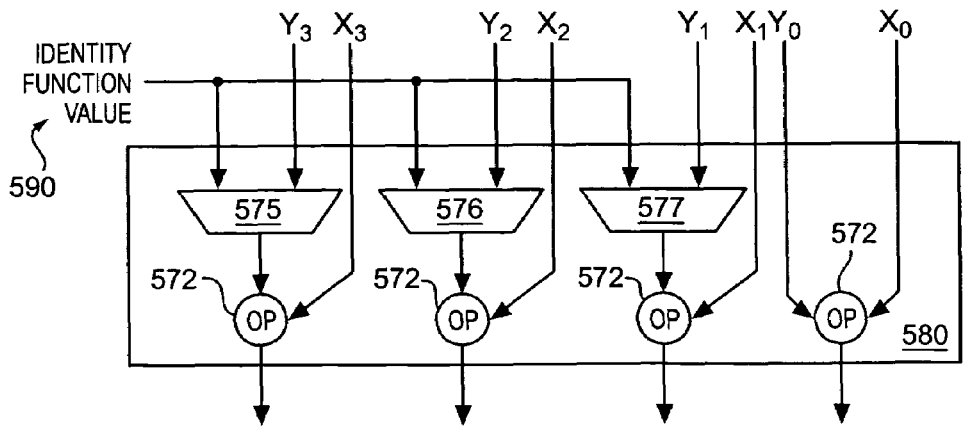
FIG. 5C conceptually illustrates circuitry for executing full-width packed data and partial-width packed data instructions according to yet another embodiment of the invention.

FIGS. 5A-5C conceptually illustrate execution units 540, 560 and 580, respectively, which may execute both full-width packed data and partial-width packed data instructions. The selection logic included in the execution units of FIGS. 5A and 5C represent exemplary pass through logic, while the selection logic of FIG. 5B is representative of clearing logic that may be employed. In the embodiments depicted, the execution units 540, 560, and 580 each include appropriate logic, circuitry and/or firmware for concurrently performing an operation 570, 571, and 572 on the full-width of the operands (X and Y).

Referring now to FIG. 5A, the execution unit 540 includes selection logic (e.g., multiplexers (MUXes) 555-557) for selecting between a value produced by the operation 570 and a value from a corresponding data element of one of the operands. The MUXes 555-557 may be controlled, for example, by a signal that indicates whether the operation currently being executed is a full-width packed data operation or a partial-width packed data operation. In alternative embodiments, additional flexibility may be achieved by including an additional MUX for data element 0 and/or independently controlling each MUX. Various means of providing MUX control are possible. According to one embodiment, such control may originate or be derived from the instruction itself or may be provided via immediate values. For example, a 4-bit immediate value associated with the instruction may be used to allow the MUXes 555-557 to be controlled directly by software. Those MUXes corresponding to a one in the immediate value may be directed to select the result of the operation while those corresponding to a zero may be caused to select the pass through data. Of course, more or less resolution may be achieved in various implementations by employing more or less bits to represent the immediate value.

Turning now to FIG. 5B, the execution unit 540 includes selection logic (e.g., MUXes 565-567) for selecting between a value produced by an operation 571 and a predetermined value (e.g., zero). As above, the MUXes 565-567 may be under common control or independently controlled.

The pass through logic of FIG. 5C (e.g., MUXes 575-576) selects between a data element of one of the operands and an identity function value 590. The identity function value 590 is generally chosen such that the result of performing the operation 572 between the identity function value 590 and the data element is the value of the data element. For example, if the operation 572 was a multiply operation, then the identity function value 590 would be 1. Similarly, if the operation 572 was an add operation, the identity function value 590 would be 0. In this manner, the value of a data element can be selectively passed through to the logical destination register 430 by causing the corresponding MUX 575-577 to output the identity function value 590.

In the embodiments described above, the circuitry was hardwired such that the partial-width operation was performed on the least significant data element portion. It is appreciated that the operation may be performed on a different data element portions than illustrated. Also, as described above, the data elements to be operated upon may be made to be software configurable by coupling all of the operations to a MUX or the like, rather than simply a subset of the operations as depicted in FIGS. 5A-5C. Further, while pass through and clearing logic are described as two options for treating resulting data elements corresponding to operations that are to be disregarded, alternative embodiments may employ other techniques. For example, a QNaN may be input as one of the operands to an operation whose result is to be disregarded. In this manner, arithmetic operations compliant with the IEEE 754 standard, IEEE std. 754-1985, published Mar. 21, 1985, will propagate a NaN through to the result without triggering an arithmetic exception.

While no apparent speed up would be achieved in the embodiments described above since the full-width of the operands can be processed in parallel, it should be appreciated that power consumption can be reduced by shutting down those of the operations whose results will be disregarded. Thus, significant power savings may be achieved. Additionally, with the use of QNaNs and/or identity function values a predictable exception model may be maintained by preventing exceptions from being triggered by data elements that are not part of the partial-width packed data operation. Therefore, reported exceptions are limited to those raised in connection with the data element(s) upon which the partial-width packed data operation purports to operate.

Figure 6:
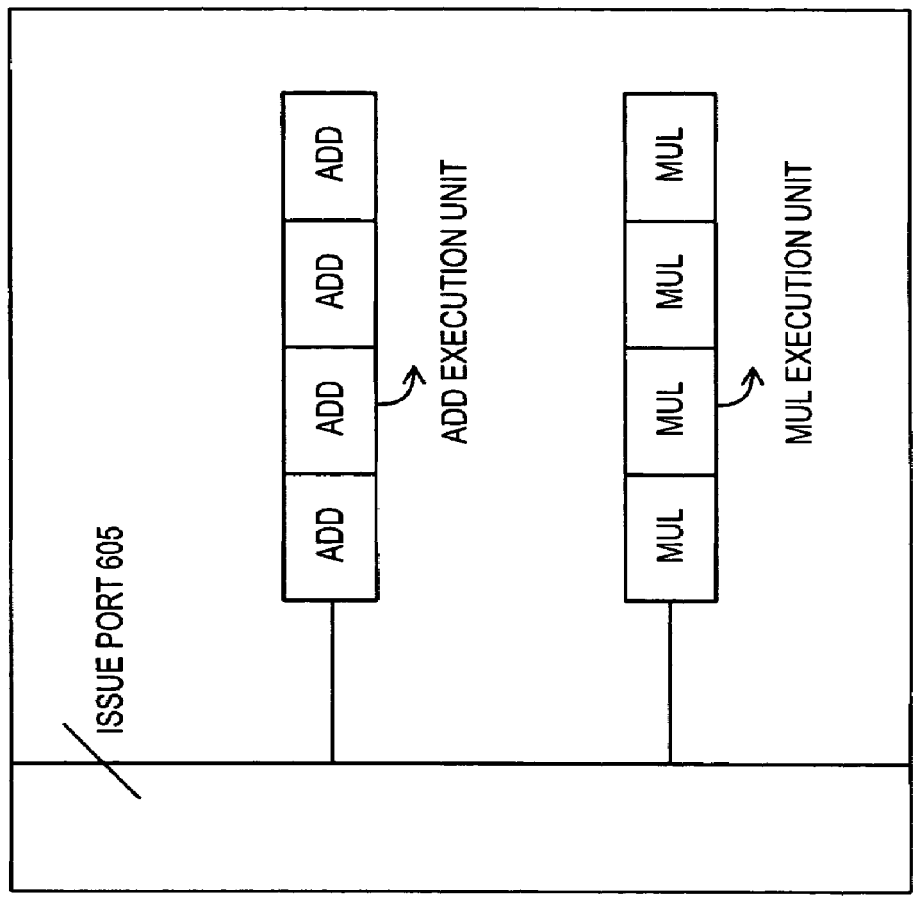
FIG. 6 illustrates an ADD execution unit and a MUL execution unit capable of operating as four separate ADD execution units and four separate MUL execution units, respectively, according to an exemplary processor implementation of SIMD.

FIG. 6 illustrates a current processor implementation of an arithmetic logic unit (ALU) that can be used to execute full-width packed data instructions. The ALU of FIG. 6 includes the circuitry necessary to perform operations on the full width of the operands (i.e., all of the data elements). FIG. 6 also shows that the ALU may contain one or more different types of execution units. In this example, the ALU includes two different types of execution units for respectively performing different types of operations (e.g., certain ALUs use separate units for performing ADD and MUL operations). The ADD execution unit and the MUL execution unit are respectively capable of operating as four separate ADD execution units and four separate MUL execution units. Alternatively, the ALU may contain one or more Multiply Accumulate (MAC) units, each capable of performing more than a single type of operation. While the following examples assume the use of ADD and MUL execution units and floating point operations, it is appreciated other execution units such as MAC and/or integer operations may also be used. Further, it may be preferable to employ a partial-width implementation (e.g., an implementation with less than a one-to-one correspondence between execution units and data elements) and additional logic to coordinate reuse of the execution units as described below.

Partial-Width Hardware and "Staggered Execution"

Figure 7B:
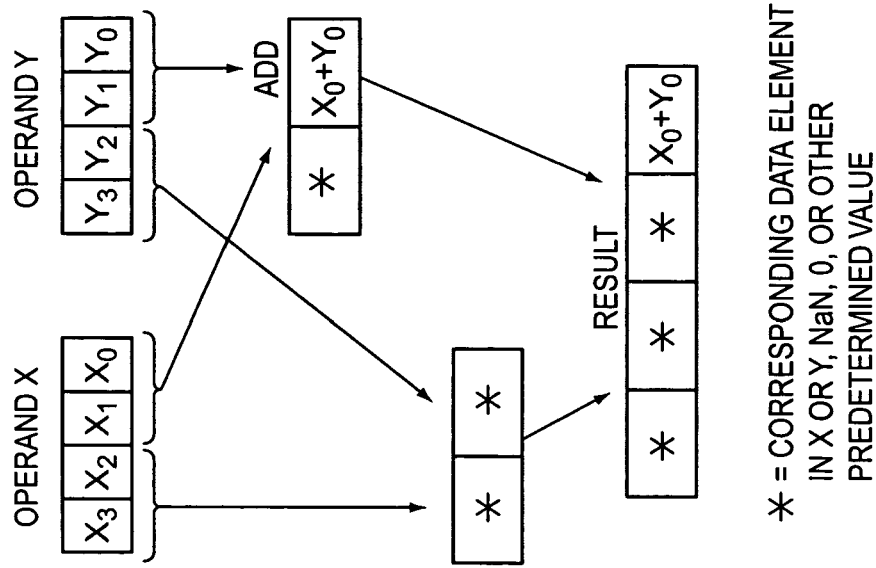
FIGS. 7A-7B conceptually illustrate a full-width packed data operation and a partial-width packed data operation being performed in a "staggered" manner, respectively.
Figure 7A:
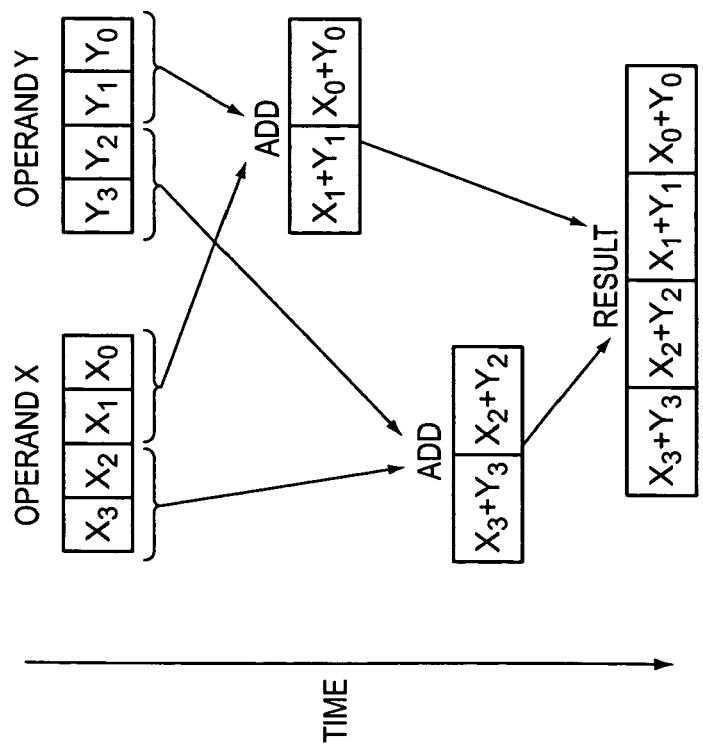

FIGS. 7A-7B conceptually illustrate a full-width packed data operation and a partial-width packed data operation being performed in a "staggered" manner, respectively. "Staggered execution" in the context of this embodiment refers to the process of dividing each of an instruction's operands into separate segments and sequentially processing each segment using the same hardware. The segments are sequentially processed by introducing a delay into the processing of the subsequent segments. As illustrated in FIGS. 7A-7B, in both cases, the packed data operands are divided into a "high order segment" (data elements 3 and 2) and a "low order segment" (data elements 1 and 0). In the example of FIG. 7A, the low order segment is processed while the high order segment is delayed. Subsequently, the high order segment is processed and the full-width result is obtained. In the example of FIG. 7B, the low order segment is processed, while whether the high order data segment is processed depends on the implementation. For example, the high order data segment may not need to be processed if the corresponding result is to be zeroed. Additionally, it is appreciated that if the high order data segment is not processed, then both the high and low order data segments may be operated upon at the same time. Similarly, in a full-width implementation (e.g., an implementation with a one-to-one correspondence between execution units and data elements) the high and low order data segments may be processed concurrently or as shown in FIG. 7A.

Additionally, although the following embodiments are described as having only ADD and MUL execution units, other types of execution units such as MAC units may also be used.

While there are a number of different ways in which the staggered execution of instructions can be achieved, the following sections describe two exemplary embodiments to illustrate this aspect of the invention. In particular, both of the described exemplary embodiments receive the same macro instructions specifying logical registers containing 128 bit operands.

In the first exemplary embodiment, each macro instruction specifying logical registers containing 128 bit operands causes the full-width of the operands to be accessed from the physical registers. Subsequent to accessing the full-width operands from the registers, the operands are divided into the low and high order segments (e.g., using latches and multiplexers) and sequentially executed using the same hardware. The resulting half-width results are collected and simultaneously written to a single logical register.

In contrast, in the second exemplary embodiment each macro instruction specifying logical registers containing 128 bit operands is divided into at least two micro instructions that each operate on only half of the operands. Thus, the operands are divided into a high and low order segment and each micro instruction separately causes only half of the operands to be accessed from the registers. This type of a division is possible in a SIMD architecture because each of the operands is independent from the other. While implementations of the second embodiment can execute the micro instructions in any order (either an in order or an out of order execution model), the micro instructions respectively cause the operation specified by the macro instruction to be independently or separately performed on the low and high order segments of the operands. In addition, each micro instruction causes half of the resulting operand to be written into the single destination logical register specified by the macro instruction.

While embodiments are described in which 128 bit operands are divided into two segments, alternative embodiments could use larger or smaller operands and/or divide those operands into more than two segments. In addition, while two exemplary embodiments are described for performing staggered execution, alternative embodiments could use other techniques.

First Exemplary Embodiment Employing "Staggered Execution"

Figure 8A:
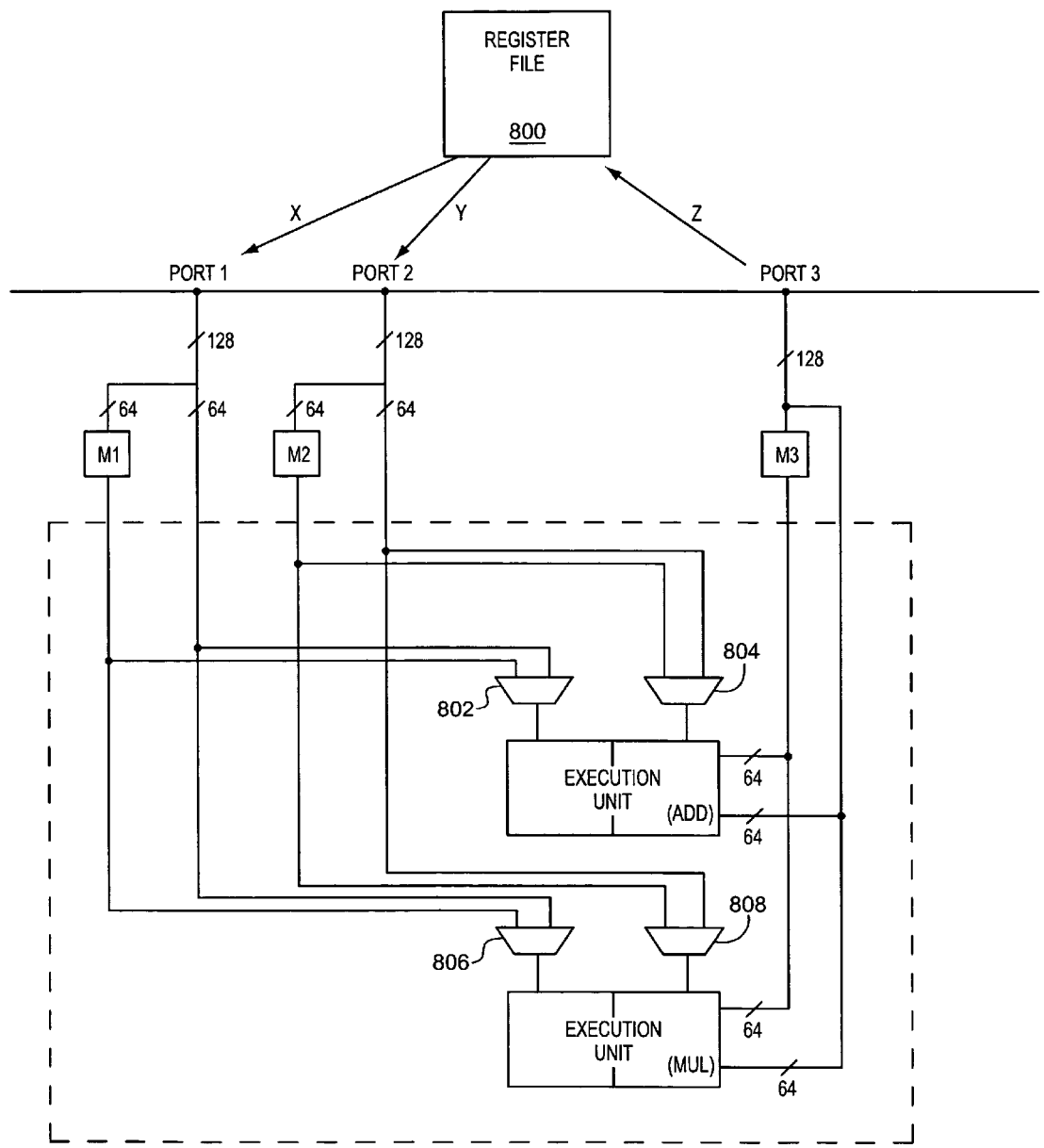
FIG. 8A conceptually illustrates circuitry within a processor that accesses full width operands from logical registers while performing operations on half of the width of the operands at a time.

FIG. 8A conceptually illustrates circuitry within a processor according to a first embodiment that accesses full width operands from the logical registers but that performs operations on half of the width of the operands at a time. This embodiment assumes that the processor execution engine is capable of processing one instruction per clock cycle. By way of example, assume the following sequence of instructions is executed: ADD X, Y; MUL A, B. At time T, 128-bits of X and 128-bits of Y are each retrieved from their respective physical registers via ports 1 and 2. The lower order data segments, namely the lower 64 bits, of both X and Y are passed into multiplexers 802 and 804 and then on to the execution units for processing. The higher order data segments, the higher 64 bits of X and Y are held in delay elements M1 and M2. At time T+1, the higher order data segments of X and Y are read from delay elements M1 and M2 and passed into multiplexers 802 and 804 and then on to the execution units for processing. In general, the delay mechanism of storing the higher order data segments in delay elements M1 and M2 allows N-bit (N=64 in this example) hardware to process 2N-bits of data. The low order results from the execution unit are then held in delay element M3 until the high order results are ready. The results of both processing steps are then written back to register file 800 via port 3. Recall that in the case of a partial-width packed data operation one or more data elements of the low or high order results may be forced to a predetermined value (e.g., zero, the value of a corresponding data element in one of X or Y, etc.) rather than the output of the ADD or MUL operation.

Continuing with the present example, at time T+1, the MUL instruction may also have been started. Thus, at time T+1, 128-bits of A and B may each have been retrieved from their respective registers via ports 1 and 2. The lower order data segments, namely the lower 64-bits, of both A and B may be passed into multiplexers 806 and 808. After the higher order bits of X and Y are removed from delay elements M1 and M2 and passed into multiplexers 806 and 808, the higher order bits of A and B may be held in storage in delay elements M1 and M2. The results of both processing steps is written back to register file 800 via port 3.

Thus, according to an embodiment of the invention, execution units are provided that contain only half the hardware (e.g. two single precision ADD execution units and two single precision MUL execution units), instead of the execution units required to process the full width of the operands in parallel as found in a current processor. This embodiment takes advantage of statistical analysis showing that multimedia applications utilize approximately fifty percent ADD instructions and fifty percent MUL instructions. Based on these statistics, this embodiment assumes that multimedia instructions generally follow the following pattern: ADD, MUL, ADD, MUL, etc. By utilizing the ADD and MUL execution units in the manner described above, the present embodiment provides for an optimized use of the execution units, thus enabling comparable performance to the current processor, but at a lower cost.

Figure 8B:
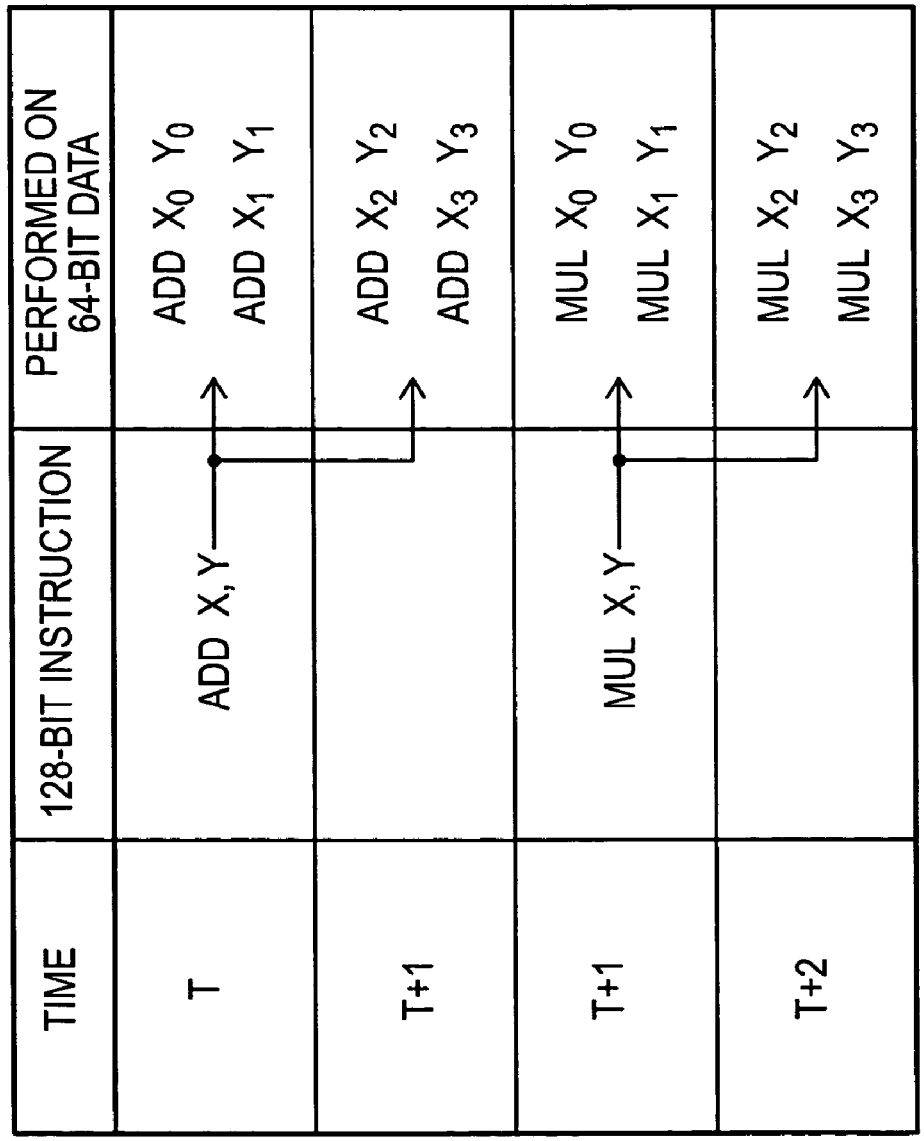
FIG. 8B is a timing chart that further illustrates the circuitry of FIG. 8A.

FIG. 8B is a timing chart that further illustrates the circuitry of FIG. 8A. More specifically, as illustrated in FIG. 8B, when instruction "ADD X, Y" is issued at time T, the two ADD execution units first perform ADDs on the lower order data segments or the lower two packed data elements of FIG. 1, namely $X_0Y_0$ and $X_1Y_1$. At time T+1, the ADD operation is performed on the remaining two data elements from the operands, by the same execution units, and the subsequent two data elements of the higher order data segment are added, namely $X_2Y_2$ and $X_3Y_3$. While the above embodiment is described with reference to ADD and MUL operations using two execution units, alternate embodiments may use any number of execution units and/or execute any number of different operations in a staggered manner.

According to this embodiment, 64-bit hardware may be used to process 128-bit data. A 128-bit register may be broken into four 32-bit elements, each of which represents a separate 32-bit value. At time T, the two ADD execution units perform ADDs first on the two lower 32-bit values, followed by an ADD on the higher 32-bit values at time T+1. In the case of a MUL operation, the MUL execution units behave in the same manner. This ability to use currently available 64-bit hardware to process 128-bit data represents a significant cost advantage to hardware manufacturers.

As described above, the ADD and MUL execution units according to the present embodiment are reused to reexecute a second ADD or MUL operation at a subsequent clock cycle. Of course, in the case of a partial-width packed data instruction, the execution units are reused but the operation is not necessarily reexecuted since power to the execution unit may be selectively shut down. At any rate, as described earlier, in order for this re-using or "staggered execution" to perform efficiently, this embodiment takes advantage of the statistical behavior of multimedia applications.

If a second ADD instruction follows a first ADD instruction, the second ADD may be delayed by a scheduling unit to allow the ADD execution units to complete the first ADD instruction, or more specifically on the higher order data segment of the first ADD instruction. The second ADD instruction may then begin executing. Alternatively, in an out-of-order processor, the scheduling unit may determine that a MUL instruction further down the instruction stream may be performed out-of-order. If so, the scheduling unit may inform the MUL execution units to begin processing the MUL instruction. If no MUL instructions are available for processing at time T+1, the scheduler will not issue an instruction following the first ADD instruction, thus allowing the ADD execution units time to complete the first ADD instruction before beginning the second ADD instruction.

Yet another embodiment of the invention allows for back-to-back ADD or MUL instructions to be issued by executing the instructions on the same execution units on half clock cycles instead of full clock cycles. Executing an instruction on the half clock cycle effectively "double pumps" the hardware, i.e. makes the hardware twice as fast. In this manner, the ADD or MUL execution units may be available during each clock cycle to process a new instruction. Double pumped hardware would allow for the hardware units to execute twice as efficiently as single pumped hardware that executes only on the full clock cycle. Double pumped hardware requires significantly more hardware, however, to effectively process the instruction on the half clock cycle.

It will be appreciated that modifications and variations of the invention are covered by the above teachings and within the purview of the appended claims without departing from the spirit and intended scope of the invention. For example, although only two execution units are described above, any number of logic units may be provided.

Second Exemplary Embodiment Employing "Staggered Execution"

According to an alternate embodiment of the invention, the staggered execution of a full width operand is achieved by converting a full width macro instruction into at least two micro instructions that each operate on only half of the operands. As will be described further below, when the macro instruction specifies a partial-width packed data operation, better performance can be achieved by eliminating micro instructions that are not necessary for the determination of the partial-width result. In this manner, processor resource constraints are reduced and the processor is not unnecessarily occupied with inconsequential micro instructions. Although the description below is written according to a particular register renaming method, it will be appreciated that other register renaming mechanisms may also be utilized consistent with the invention. The register renaming method as described below assumes the use of a Register Alias Table (RAT), a Reorder Buffer (ROB) and a retirement buffer, as described in detail in U.S. Pat. No. 5,446,912. Alternate register renaming methods such as that described in U.S. Pat. No. 5,197,132 may also be implemented.

Figure 9:
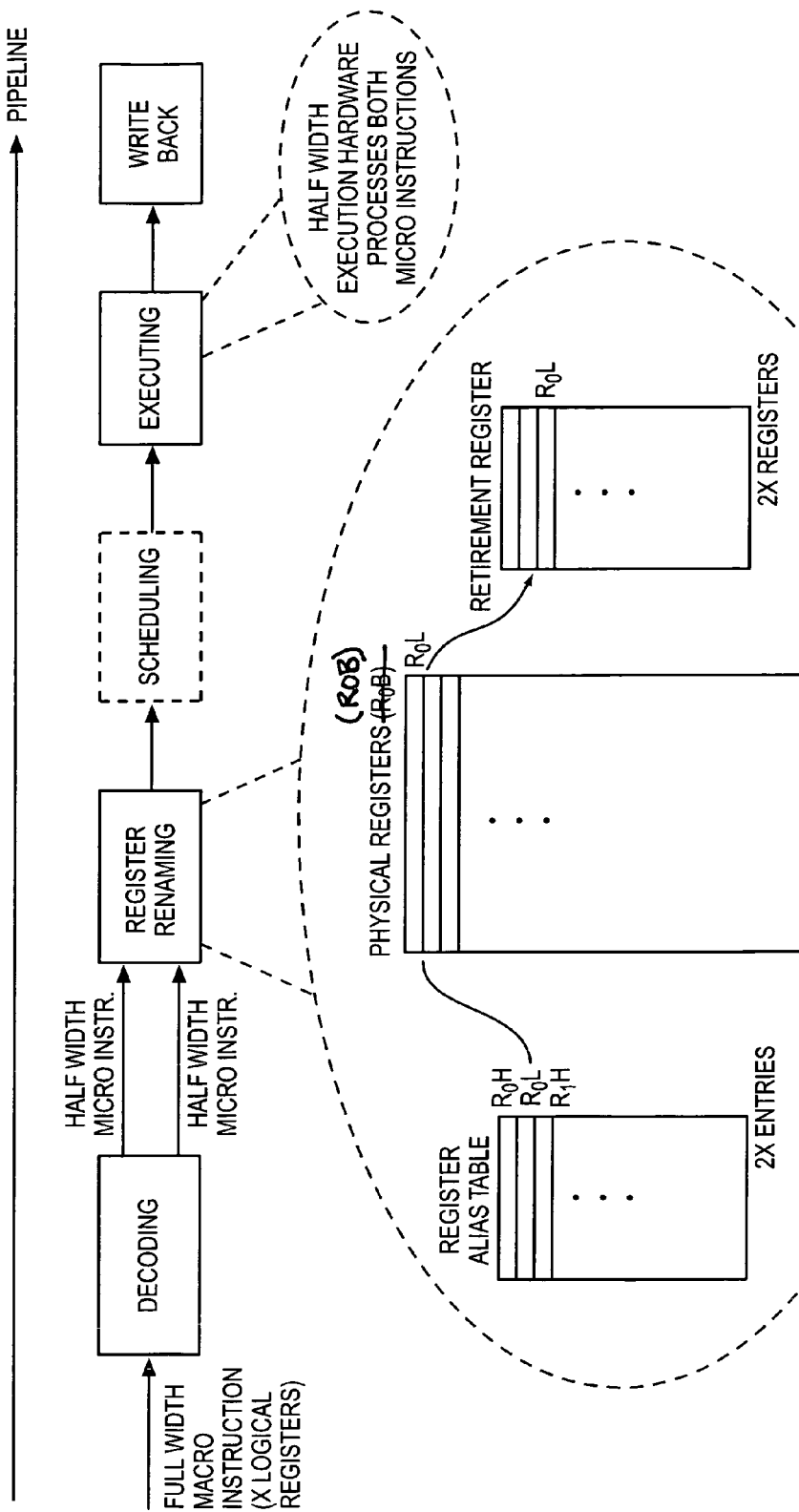
FIG. 9 conceptually illustrates one embodiment of an out-of-order pipeline to perform operations on operands in a "staggered" manner by converting a macro instruction into a plurality of micro instructions that each processes a portion of the full width of the operands.

FIG. 9 conceptually illustrates one embodiment of a pipeline to perform operations on operands in a "staggered" manner by converting a macro instruction into a plurality of micro instructions that each processes a portion of the full width of the operands. It should be noted that various other stages of the pipeline, e.g. a prefetch stage, have not been shown in detail in order not to unnecessarily obscure the invention. As illustrated, at the decode stage of the pipeline, a full width macro instruction is received, specifying logical source registers, each storing a full width operand (e.g. 128-bit). By way of example, the described operands are 128-bit packed floating point data operands. In this example, the processor supports Y logical registers for storing packed floating point data. The macro instruction is converted into micro instructions, namely a "high order operation" and a "low order operation," that each cause the operation of the macro instruction to be performed on half the width of the operands (e.g., 64 bits).

The two half width micro instructions then move into a register renaming stage of the pipeline. The register renaming stage includes a variety of register maps and reorder buffers. The logical source registers of each micro instruction are pointers to specific register entries in a register mapping table (e.g. a RAT). The entries in the register mapping table in turn point to the location of the physical source location in an ROB or in a retirement register. According to one embodiment, in order to accommodate the half width high and low order operations described above, a RAT for packed floating point data is provided with Y*2 entries. Thus, for example, instead of a RAT with the entries for 8 logical registers, a RAT is created with 16 entries, each addressed as "high" or "low." Each entry identifies a 64-bit source corresponding to either a high or a low part of the 128-bit logical register.

Each of the high and low order micro instructions thus has associated entries in the register mapping table corresponding to the respective operands. The micro instructions then move into a scheduling stage (for an out of order processor) or to an execution stage (for an in order processor). Each micro instruction retrieves and separately processes a 64-bit segment of the 128-bit operands. One of the operations (e.g. the lower order operation) is first executed by the 64-bit hardware units. Then, the same 64-bit hardware unit executes the higher order operation. It should be appreciated that zero or more instructions may be executed between the lower and higher order operations.

Although the above embodiment describes the macro instruction being divided into two micro instructions, alternate embodiments may divide the macro instruction into more micro instruction. While FIG. 9 shows that the packed floating point data is returned to a retirement register file with Y*2 64-bit registers, each designated as high or low, alternate embodiments may use a retirement register file with Y 128-bit registers. In addition, while one embodiment is described having a register renaming mechanism with a reorder buffer and retirement register files, alternate embodiments may use any register renaming mechanism. For example, the register renaming mechanism of U.S. Pat. No. 5,197,132 uses a history queue and backup map.

Figure 10:
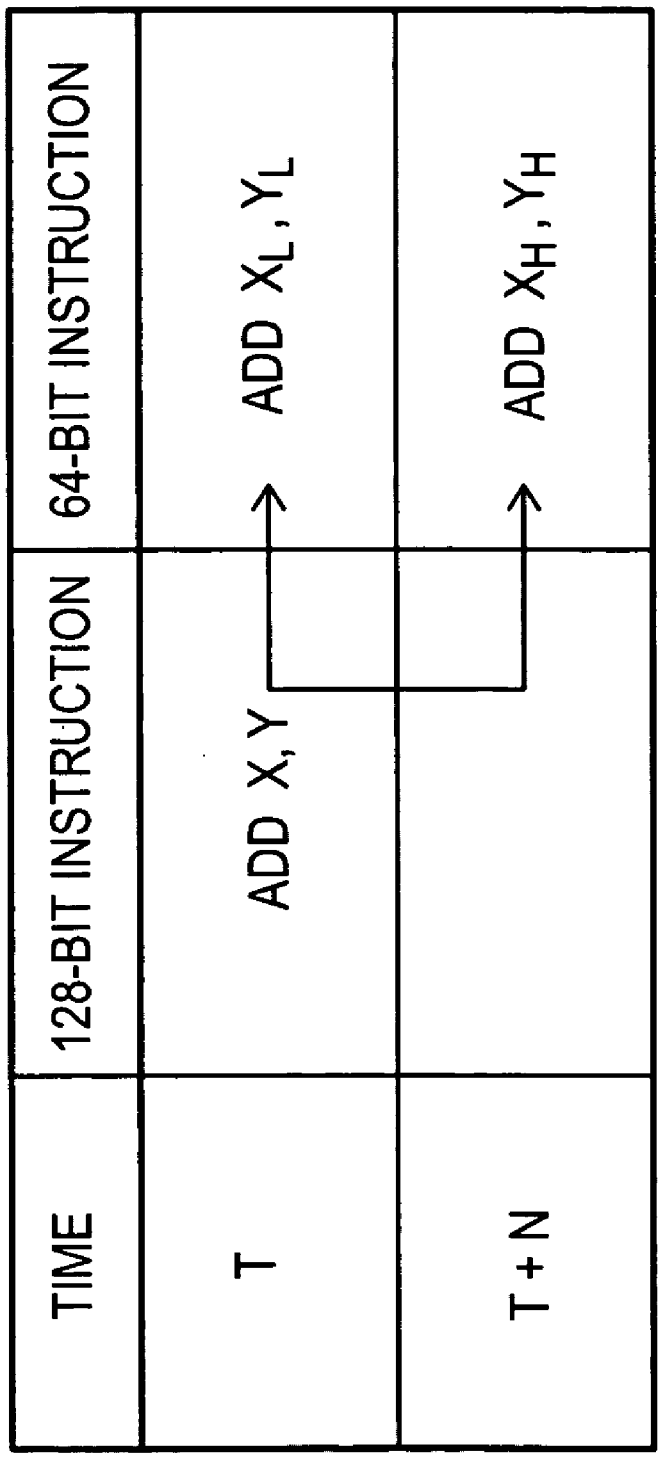
FIG. 10 is a timing chart that further illustrates the embodiment described in FIG. 9.

FIG. 10 is a timing chart that further illustrates the embodiment described in FIG. 9. At time T, a macro instruction "ADD X, Y" enters the decode stage of the pipeline of FIG. 9. By way of example, the macro instruction here is a 128-bit instruction. The 128-bit macro instruction is converted into two 64-bit micro instructions, namely the high order operation, "ADD $X_H, Y_H$" and the low order operation, "ADD $X_L, Y_L$." Each micro instruction then processes a segment of data containing two data elements. For example, at time T, the low order operation may be executed by a 64-bit execution unit. Then at a different time (e.g., time T+N), the high order operation is executed by the same 64-bit execution unit. This embodiment of the invention is thus especially suitable for processing 128-bit instructions using existing 64-bit hardware systems without significant changes to the hardware. The existing systems are easily extended to include a new map to handle packed floating point, in addition to the existing logical register maps.

Figure 11:
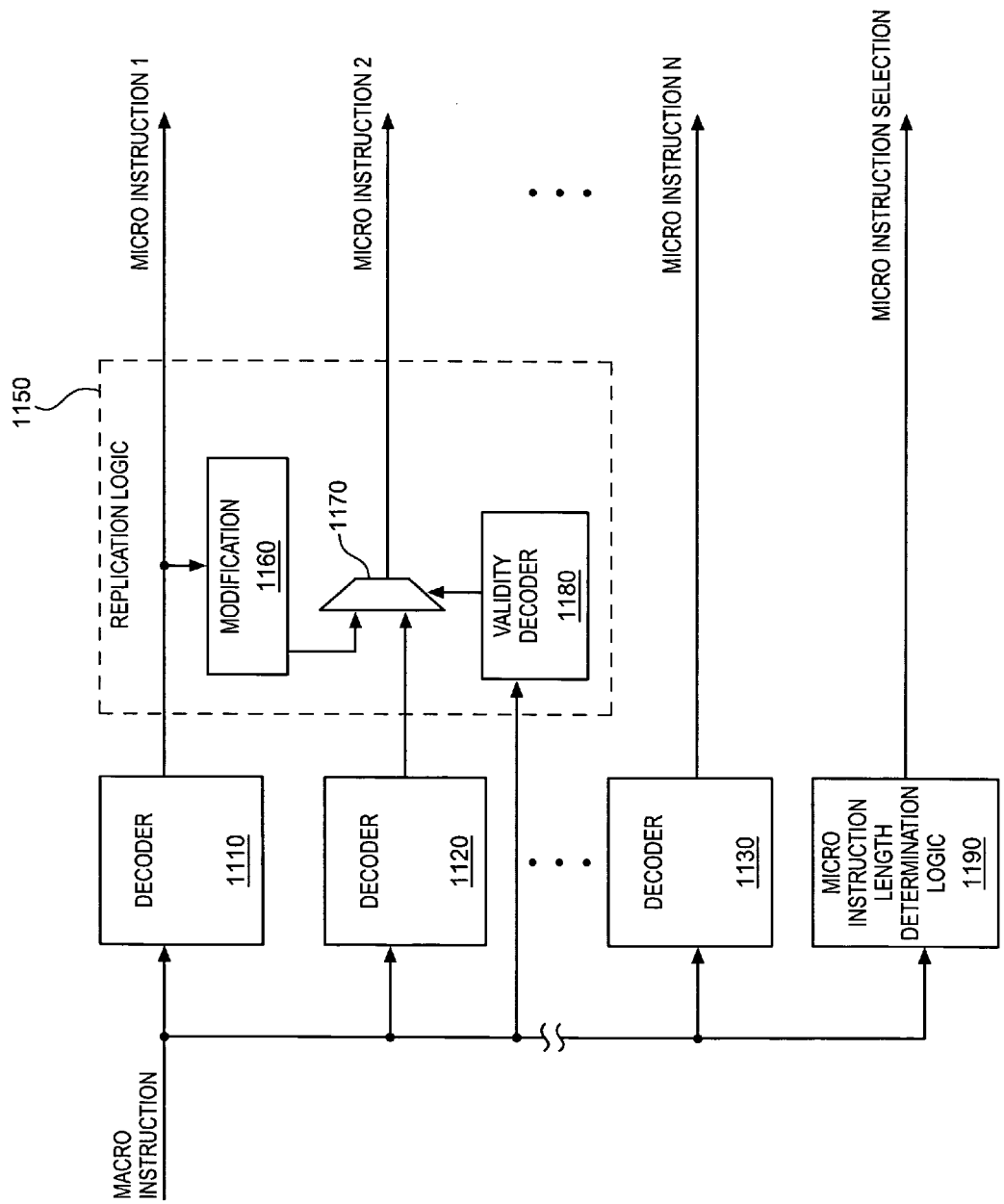
FIG. 11 is a block diagram illustrating decoding logic that may be employed to accomplish the decoding processing according to one embodiment of the invention.

Referring now to FIG. 11, decoding logic that may be employed according to one embodiment of the invention is described. Briefly, in the embodiment depicted, a plurality of decoders 1110, 1120, and 1130 each receive a macro instruction and convert it into a micro instruction. Then the micro operating are sent down the remainder of the pipeline. Of course, N micro instructions are not necessary for the execution of every macro instruction. Therefore, it is typically the case that only a subset of micro instructions are queued for processing by the remainder of the pipeline.

As described above, packed data operations may be implemented as two half width micro instructions (e.g., a high order operation and a low order operation). Rather than independently decoding the macro instruction by two decoders to produce the high and low order operations as would be typically required by prior processor implementations, as a feature of the present embodiment both micro instructions may be generated by the same decoder. In this example, this is accomplished by replication logic 1150 which replicates either the high or low order operation and subsequently modifies the resulting replicated operation appropriately to create the remaining operation. Importantly, as was described earlier, by carefully encoding the register address space, the registers referenced by the micro instructions (e.g., the logical source and destination registers) can be made to differ by a single bit. As a result, the modification logic 1160 in its most simple form may comprise one or more inverters to invert the appropriate bits to produce a high order operation from a low order operation and vice versa. In any event, the replicated micro instruction is then passed to multiplexer 1170. The multiplexer 1170 also receives a micro instruction produced by decoder 1120. In this example, the multiplexer 1170, under the control of a validity decoder 1180, outputs the replicated micro instruction for packed data operations (including partial-width packed data operations) and outputs the micro instruction received from decoder 1120 for operations other than packed data operations. Therefore, it is advantageous to optimize the opcode map to simplify the detection of packed data operations by the replication logic 1150. For example, if only a small portion of the macro instruction needs to be examined to distinguish packed data operations from other operations, then less circuitry may be employed by the validity decoder 1180.

In an implementation that passes through source data elements to the logical destination register for purposes of executing partial-width packed data operations, in addition to selection logic similar to that described with respect to FIGS. 5A and 5C, logic may be included to eliminate ("kill") one of the high or low order operations. Preferably, for performance reasons, the extraneous micro instruction is eliminated early in the pipeline. This elimination may be accomplished according to the embodiment depicted by using a micro instruction selection signal output from micro instruction length determination circuitry 1190. The micro instruction length determination logic 1190 examines a portion of the macro instruction and produces the micro instruction selection signal which indicates a particular combination of one or more micro instructions that are to proceed down the pipeline. In the case of a scalar SIMD instruction, only one of the resulting high and low order operations will be allowed to proceed. For example, the micro instruction selection signal may be represented as a bit mask that identifies those of the micro instructions that are to be retained and those that are to be eliminated. Alternatively, the micro instruction selection signal may simply indicate the number of micro instructions from a predetermined starting point that are to be eliminated or retained. Logic required to perform the elimination described above will vary depending upon the steering mechanism that guides the micro instructions through the remainder of the pipeline. For instance, if the micro instructions are queued, logic may be added to manipulate the head and tail pointers of the micro instruction queue to cause invalid micro instructions to be overwritten by subsequently generated valid micro instructions. Numerous other elimination techniques will be apparent to those of ordinary skill in the art.

Although for simplicity only a single macro instruction is shown as being decoded at a time in the embodiment depicted, in alternative embodiments multiple macro instructions may be decoded concurrently. Also, it is appreciated that micro instruction replication has broader applicability than that illustrated by the above embodiment. For example, in a manner similar to that described above, full-width and partial-width packed data macro instructions may be decoded by the same decoder. If a prefix is used to distinguish full-width and partial width packed data macro instructions, the decoder may simply ignore the prefix and decode both types of instructions in the same manner. Then, the appropriate bits in the resulting micro operations may be modified to selectively enable processing for either all or a subset of the data elements. In this manner, full-width packed data micro operations may be generated from partial-width packed data micro operations or vice versa, thereby reducing complexity of the decoder.

Thus, a method and apparatus for efficiently executing partial-width packed data instructions are disclosed. These specific arrangements and methods described herein are merely illustrative of the principles of the invention. Numerous modifications in form and detail may be made by those of ordinary skill in the art without departing from the scope of the invention. Although this invention has been shown in relation to a particular preferred embodiment, it should not be considered so limited. Rather, the invention is limited only by the scope of the appended claims.

What is claimed is:

1. A processor-implemented method comprising:
receiving a single scalar packed data instruction, the scalar packed data instruction specifying locations in a 128-bit logical register file of a first 128-bit packed data operand and a second 128-bit packed data operand, each of the 128-bit packed data operands including a low-order segment and a high-order segment, and each of the segments including two 32-bit single precision floating point data elements; and
storing, as a result of executing the single scalar packed data instruction within the processor, in a storage area specified by the scalar packed data instruction, a 128-bit packed data result operand, the 128-bit packed data result operand including a single data element that is a result of an operation selected from an add operation and a multiply operation performed on a single pair of corresponding data elements of the first and second 128-bit packed data operands, and the 128-bit packed data result operand including a plurality of other data elements having values that are not results of either add operations or multiply operations performed on pairs of corresponding data elements of the first and second 128-bit packed data operands.

2. The method of claim 1, further comprising generating the 128-bit packed data result operand by sequentially processing the low-order segments and the high-order segments on the same circuit.

3. The method of claim 1, further comprising:
generating a micro instruction; and
using the micro instruction to access the law-order segments without accessing the high-order segments.

4. The method of claim 1, further comprising:
accessing full-widths of the first and second 128-bit packed data operands from the specified locations;
dividing each of the first and second 128-bit packed data operands into the low-order segments and the high-order segments; and
processing the low-order segments and the high-order segments at different times on the same circuit.

5. The method of claim 1, wherein said storing comprises storing the 128-bit packed data result operand over the first 128-bit packed data operand.

6. An apparatus comprising:
a 128-bit logical register file to store 128-bit packed data operands;
a first circuit to receive and decode a scalar packed data instruction, the scalar packed data instruction specifying storage areas in the 128-bit logical register file of a first 128-bit packed data operand and a second 128-bit packed data operand, each of the 128-bit packed data operands including a low-order segment and a high-order segment, and each of the segments including two 32-bit single precision floating point data elements; and
a second circuit coupled with the first circuit and coupled with the 128-bit logical register file, the second circuit, as a result of executing the scalar packed data instruction, to generate a 128-bit packed data result operand according to the scalar packed data instruction, the 128-bit packed data result operand including a single data element that is a result of an operation selected from an add operation and a multiply operation that is performed on a single pair of corresponding data elements of the first and second 128-bit packed data operands, and the 128-bit packed data result operand including a plurality of other data elements having one or more predetermined values.

7. The apparatus of claim 6, wherein the second circuit comprises circuitry to sequentially process the low-order segments and the high-order segments at different times.

8. The apparatus of claim 6, wherein the first circuit comprises circuitry to generate a micro instruction to access the low-order segments without accessing the high-order segments.

9. The apparatus of claim 6, wherein the second circuit comprises:
a first circuit portion to access full-widths of the first and second 128-bit packed data operands from the specified storage areas;
a second circuit portion to divide the first and second 128-bit packed data operands into the low-order segments and the high-order segments; and
a third circuit portion to sequentially process the low-order segments and the high-order segments.

10. The apparatus of claim 6, wherein the second circuit comprises circuitry to generate a first data element of said plurality of other data elements by an approach selected from:

passing a data clement of one of the 128-bit packed data operands to the 128-bit packed data result operand;

setting the first data element of the 128-bit packed data result operand to an identify function value; and zeroing the first data element of the 128-bit packed data result operand.

11. A system comprising:

a bus;

a memory that is coupled with the bus;

a network coupling that is coupled with the bus; and a processor that is coupled with the bus, wherein the processor includes:

a 128-bit logical register file of the processor to store 128-bit packed data operands;

a first circuit of the processor to receive and decode a scalar packed data instruction, the scalar packed data instruction specifying storage areas in the 128-bit logical register file of a first 128-bit packed data operand and a second 128-bit packed data operand, each of the 128-bit packed data operands including a low-order segment and a high-order segment, and each of the segments including two 32-bit single precision floating point data elements; and a second circuit of the processor that is coupled with the first circuit and coupled with the 128-bit logical register file, the second circuit responsive to the scalar packed data instruction to generate a 128-bit packed data result operand according to the scalar packed data instruction, the 128-bit packed data result operand including a single data element that is a result of an operation selected from an add operation and a multiply operation that is performed on a single pair of corresponding data elements of the first and second 128-bit packed data operands, and the 128-bit packed data result operand including a plurality of other data elements having values that are not results of either add operations or multiply operations performed on pairs of corresponding data elements of the first and second 128-bit packed data operands.

12. The system of claim 11, wherein the second circuit comprises circuitry to process the low-order segments and, at a different time, to process the high-order segments.

13. The system of claim 11, wherein the first circuit comprises circuitry to generate a micro instruction to access the low-order segments without accessing the high-order segments.

14. The system of claim 11, wherein the second circuit comprises:

a first circuit portion to receive full-widths of the first and second 128-bit packed data operands from the specified storage areas; and a second circuit portion to process the low-order segments and, at a different time, to process the high-order segments.

15. The system of claim 11, wherein the second circuit comprises circuitry to generate a first data element of said plurality of other data elements by an approach selected from:

passing a data element of one of the 128-bit packed data operands to the 128-bit packed data result operand;

setting the first data element of the 128-bit packed data result operand to an identify function value; and zeroing the first data element of the 128-bit packed data result operand.

16. An article comprising a machine-readable medium having stored thereon data representing a scalar packed data instruction that if executed causes a machine to:

access a first 128-bit packed data operand and a second 128-bit packed data operand from locations that are specified by the data, each of the 128-bit packed data operands including a low-order segment and a high-order segment, and each of the segments including two 32-bit single precision floating point data elements;

generate a 128-bit packed data result operand, the 128-bit packed data result operand including a single data element that is a result of an operation selected from an add operation and a multiply operation performed on a single pair of corresponding data elements of the first and second 128-bit packed data operands, and the 128-bit packed data result operand including a plurality of other data elements having values that are not results of either add operations or multiply operations performed on pairs of corresponding data elements of the first and second 128-bit packed data operands; and store, in a storage area specified by the data, the 128-bit packed data result operand.

17. The article of claim 16, wherein the data if executed causes the machine to:

process the low-order segments at one time, and process the high-order segments at a different time, on the same circuit.

18. The article of claim 16, wherein the data if executed causes the machine to:

generate a micro instruction; and use the micro instruction to access the law-order segments without accessing the high-order segments.

19. The article of claim 16, wherein the data if executed causes the machine to:

access full-widths of the first and second 128-bit packed data operands from the specified locations;

divide the first and second 128-bit packed data operands into the low-order segments and the high-order segments; and process the low-order segments at one time, and process the high-order segments at a different time, on the same circuit.

20. The article of claim 16, wherein the data if executed causes the machine to:

store the 128-bit packed data result operand over the first 128-bit packed data operand.

21. The apparatus of claim 6, wherein the second circuit comprises a multiplexer to select between a result of an operation that is performed on a pair of corresponding data elements of the first and second 128-bit packed data operands, and a predetermined value.

22. The apparatus of claim 6, wherein a first data element of the plurality of other data element of the 128-bit packed data result operand has a predetermined value that is selected from a value of a data element from one of the first and second 128-bit packed data operands, a value of zero, and a not-a-number (NaN) indication.

23. The article of claim 16, wherein the machine-readable medium comprises one of a read only memory (ROM), a random access memory (RAM), a magnetic disk storage medium, an optical storage medium, and a flash memory device.

24. The apparatus of claim 6, wherein the 128-bit logical register file is capable of being implemented as a stack referenced register file.

25. An apparatus comprising:

a register file to provide logical registers to store packed data operands, each of the packed data operands including multiple data elements, wherein the register file is capable of being implemented as a stack referenced register file;

a decoder to receive instructions including a partial-width packed data instruction that specifies the generation of a packed data result, the packed data result including as a first data element a result of an operation performed on one pair of corresponding data elements of a first packed data operand and a second packed data operand, and the packed data result including as a second data element a predetermined value; and an execution unit coupled with the decoder and the register file.

26. The apparatus of claim 25, wherein the predetermined value comprises a value of a data element of one of the first and second packed data operands.

27. The apparatus of claim 25, wherein the execution unit is to sequentially process low-order segments of the first and second packed data operands at a different time than high-order segments of the first and second packed data operands are processed.

28. The apparatus of claim 27, wherein the decoder is to decode the partial-width packed data instruction into, a micro instruction that is capable of accessing only one of the low-order segments and the high order segments.

29. The apparatus of claim 27, wherein the execution unit comprises a delay element to delay one of the segments while another of the segments is processed.

* * * * *